United States Patent [19]

Jerrim et al.

[11] Patent Number: 4,653,076

[45] Date of Patent: Mar. 24, 1987

[54] TIMING SIGNAL CORRECTION SYSTEM FOR USE IN DIRECT SEQUENCE SPREAD SIGNAL RECEIVER

[75] Inventors: John W. Jerrim, Lilburn; Lawrence B. Horwitz, Alpharetta, both of Ga.

[73] Assignee: Sangamo Weston, Inc., Norcross, Ga.

[21] Appl. No.: 592,668

[22] Filed: Mar. 23, 1984

[51] Int. Cl.[4] ............................................... H04L 7/02
[52] U.S. Cl. ...................................... 375/115; 370/18
[58] Field of Search ................... 375/1, 115, 107, 111, 375/96; 370/18

[56] References Cited

U.S. PATENT DOCUMENTS

| | | | |
|---|---|---|---|
| 3,947,634 | 3/1976 | Betts | 375/1 |
| 4,164,628 | 8/1979 | Ward et al. | 375/1 |
| 4,203,071 | 5/1980 | Bowles et al. | 375/115 |
| 4,301,537 | 11/1981 | Roos | 375/115 |
| 4,423,517 | 12/1983 | Danno et al. | 375/1 |
| 4,485,477 | 11/1984 | Nossen | 375/1 |

Primary Examiner—Robert L. Griffin
Assistant Examiner—M. Huseman
Attorney, Agent, or Firm—Gaudier Dale

[57] ABSTRACT

A direct sequence spread spectrum transmitter and receiver can be synchronized when the timing reference frequency is less than or equal to the data sampling rate and the ratio of the data sampling rate to the timing reference is an integer by combining two, four or eight consecutive data samples to yield one data sample point. By combining these data samples, an optimum data sample point may be determined while receiving an alternating sign preamble by comparing the magnitudes of all possible summations and selecting the sample which gives a maximum output. If each sample is assigned to its own synchronization point, then synchronization may be accomplished by locking to the time that gives the maximum output.

2 Claims, 38 Drawing Figures

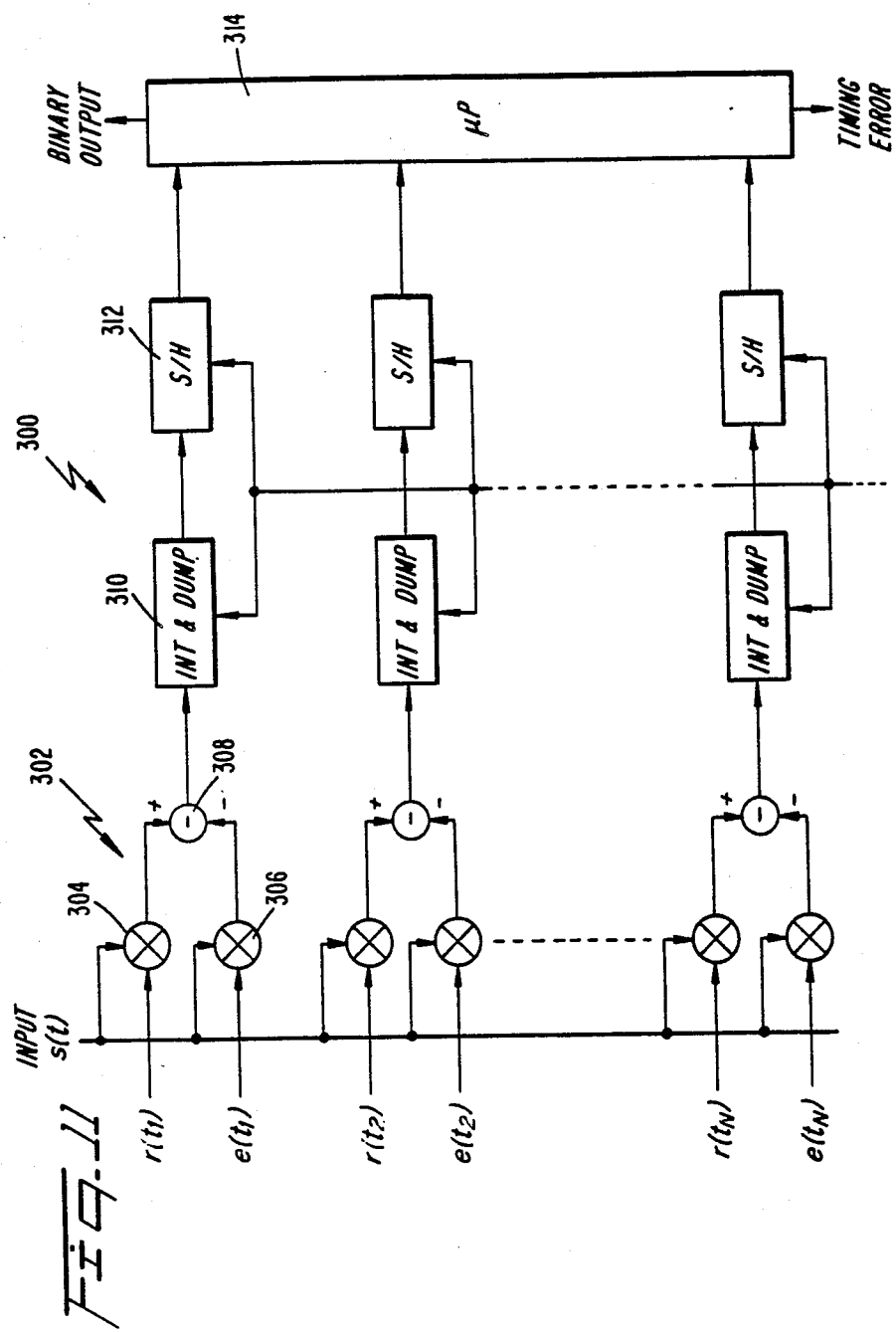

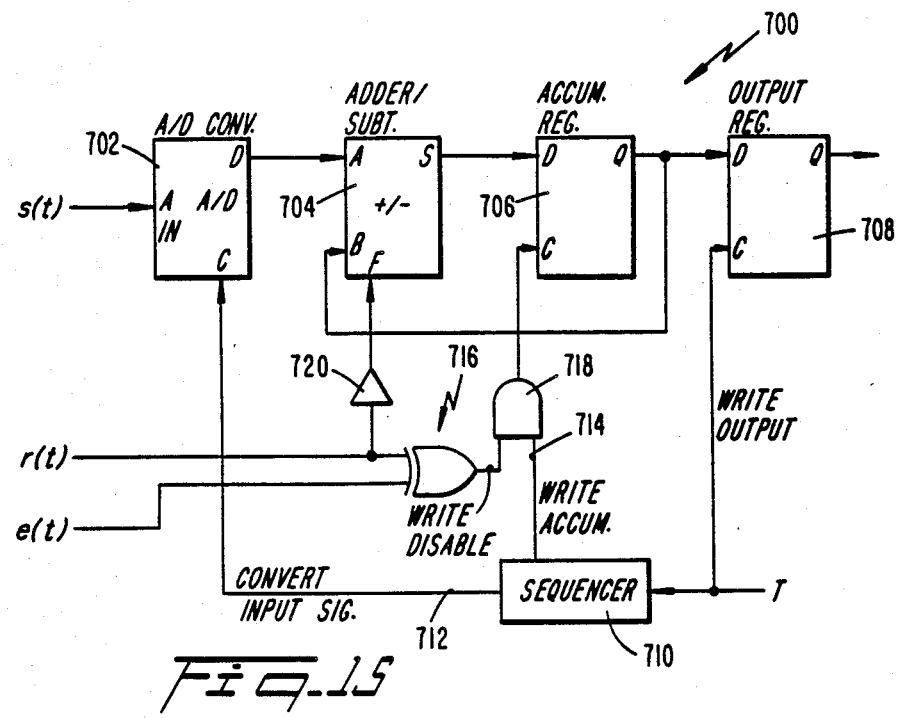
Fig. 15
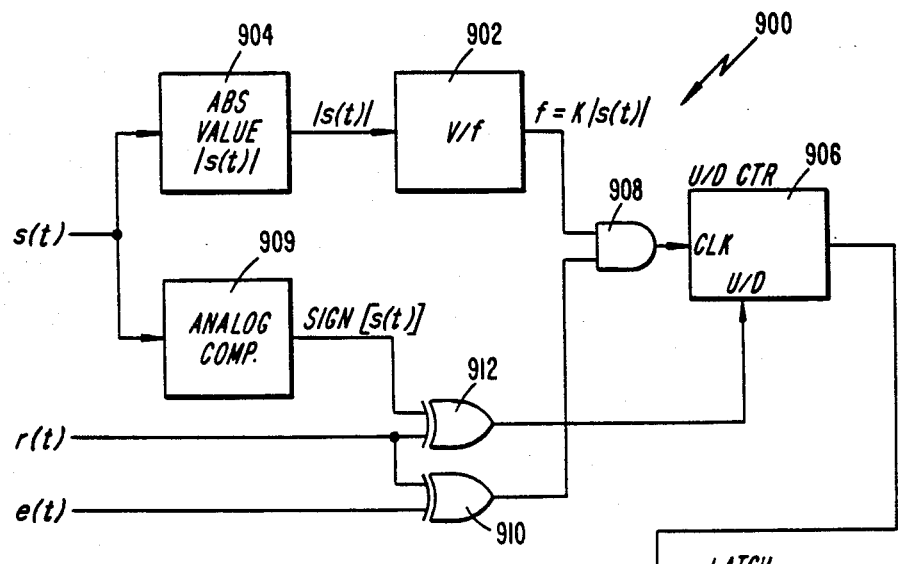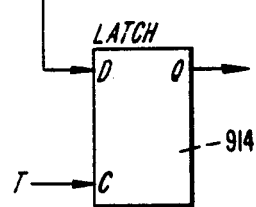
Fig. 17

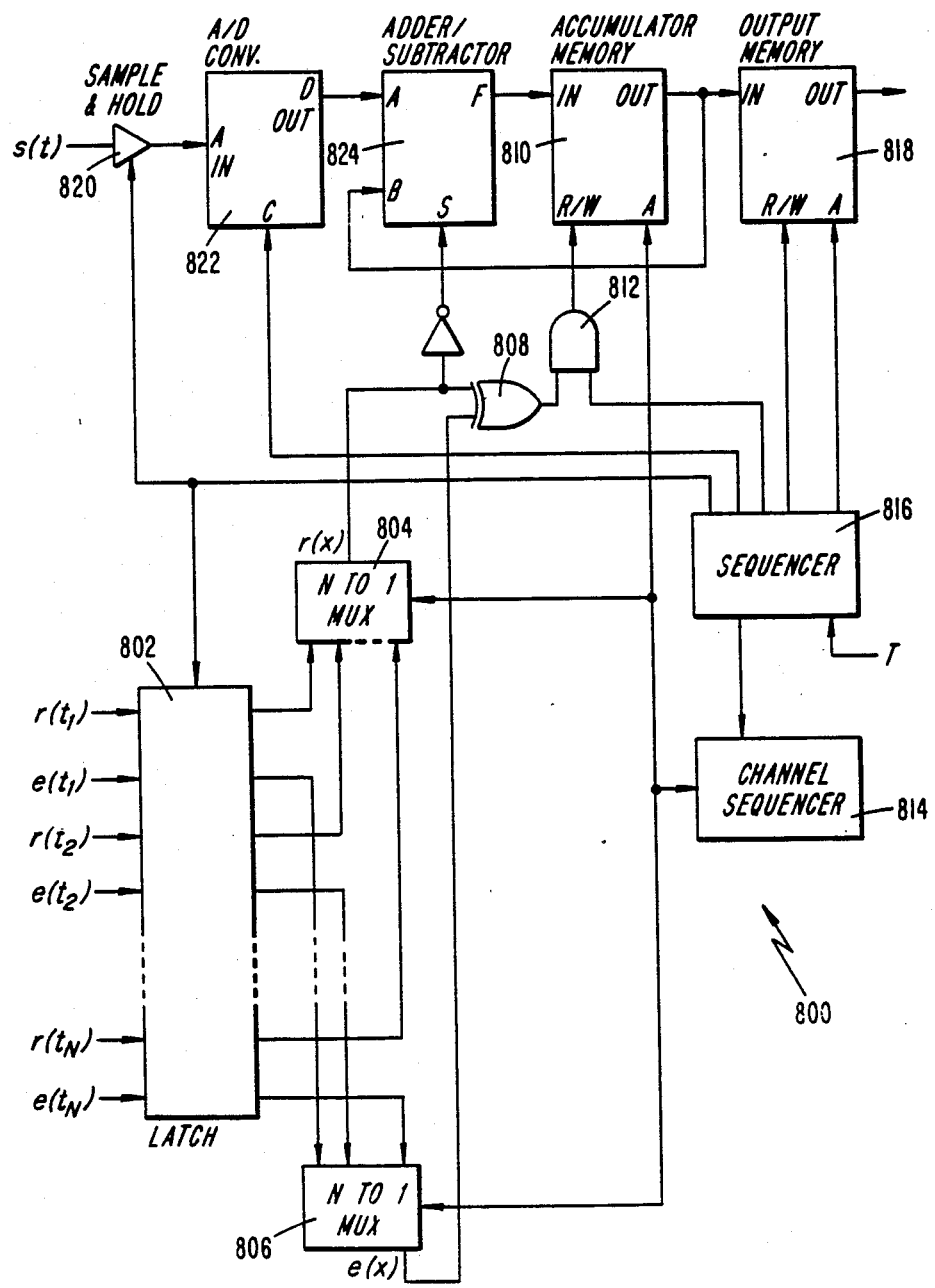

IN PHASE (θ=0°) AND QUADRATURE PHASE (θ=90°) CORRELATION PATTERN

FINE TUNING
SERIAL HUNTING

SIGNAL DETECTION

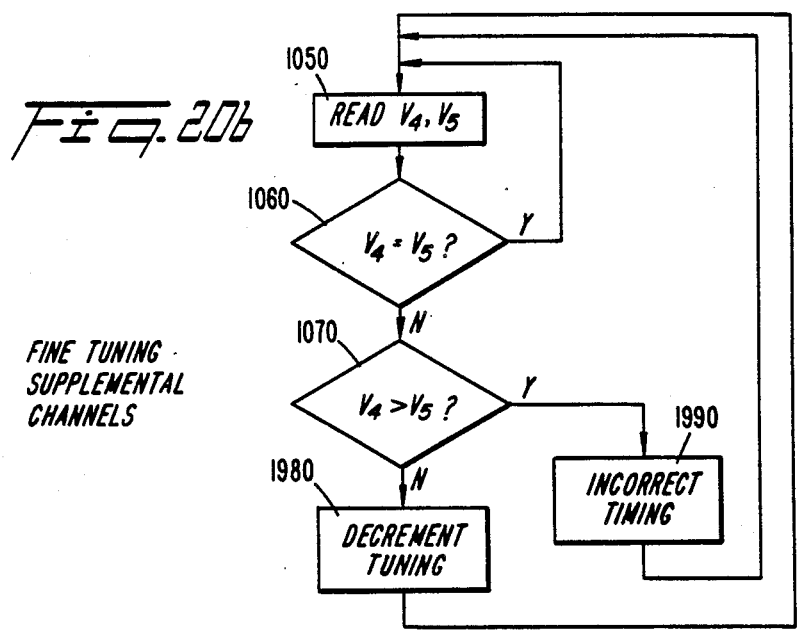
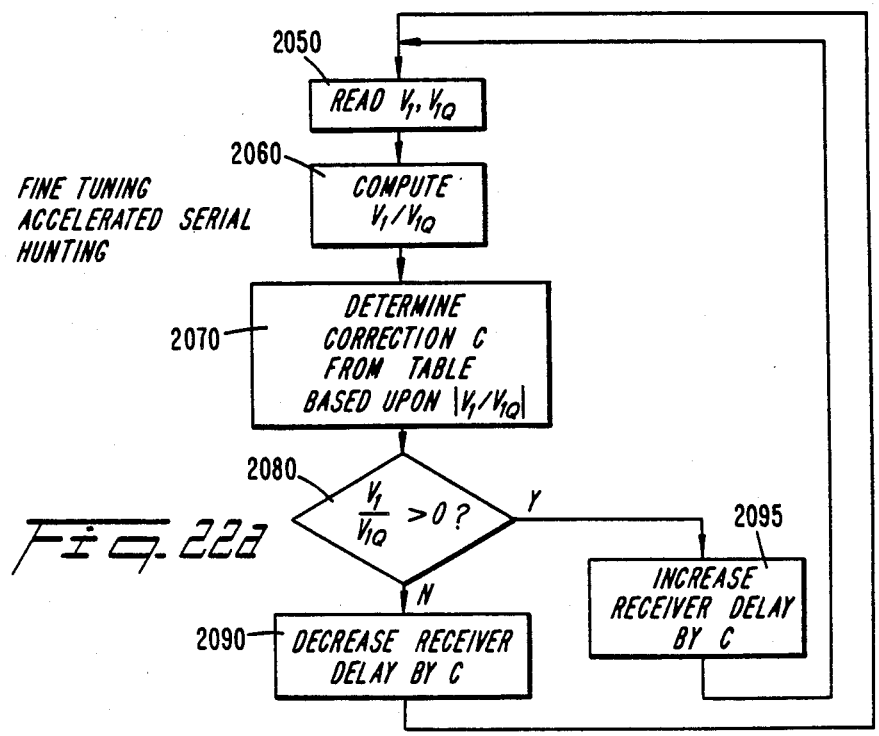

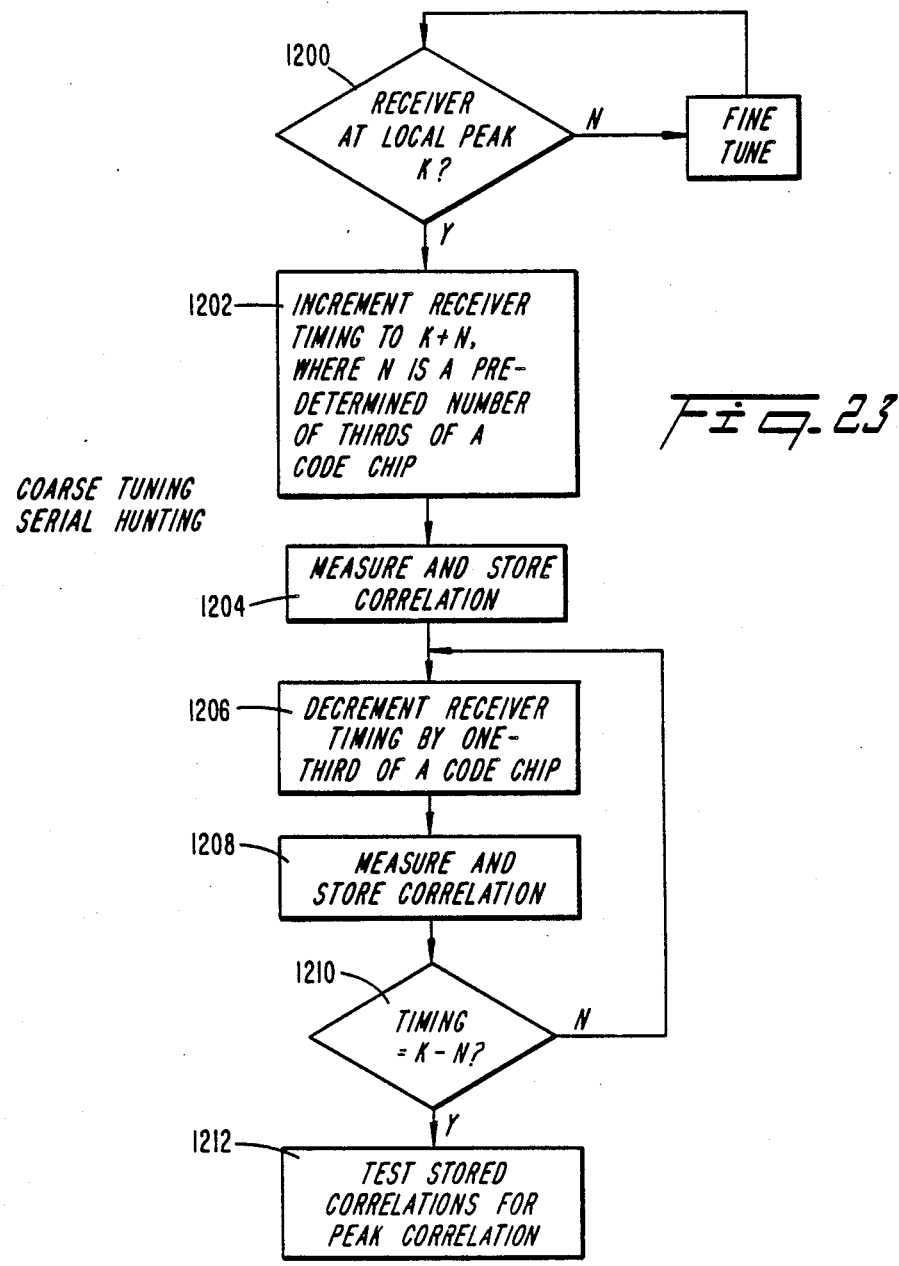

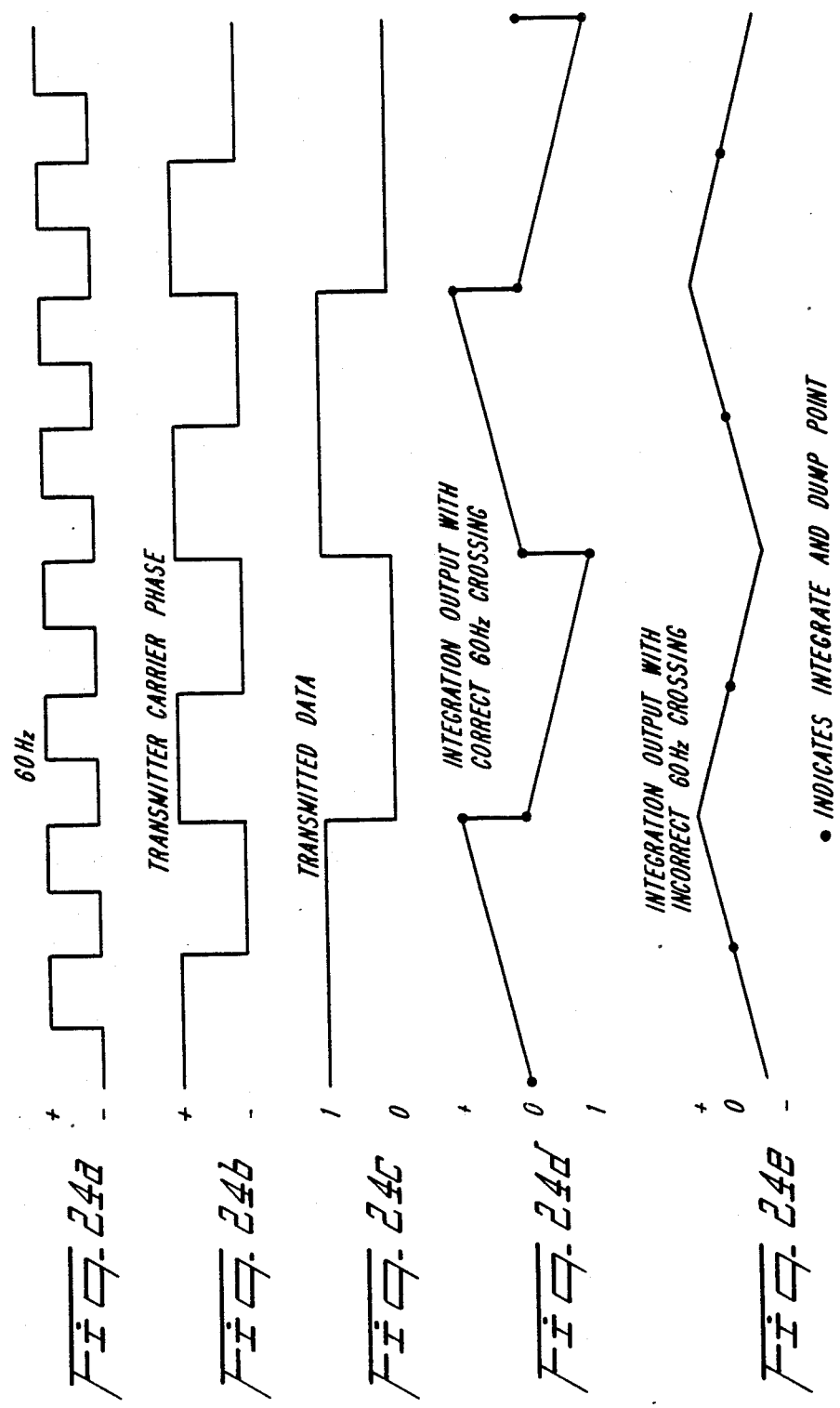

TIMING SIGNAL CORRECTION SYSTEM FOR USE IN DIRECT SEQUENCE SPREAD SIGNAL RECEIVER

CROSS REFERENCES TO RELATED APPLICATIONS

This application is related to the following copending applications assigned to the assignee of this application: Application Ser. No. 06/592,669, filed on Mar. 23, 1984 and entitled CODE DIVISION MULTIPLEXER USING DIRECT SEQUENCE SPREAD SPECTRUM SIGNAL PROCESSING; Application Ser. No. 06/592,670, filed on Mar. 23, 1984 and entitled CORRELATION DETECTORS FOR USE IN DIRECT SEQUENCE SPREAD SPECTRUM SIGNAL RECEIVER; Application Ser. No. 06/592,674, filed on Mar. 24, 1984 and entitled SYSTEM FOR IMPROVING SIGNAL-TO-NOISE RATIO IN A DIRECT SEQUENCE SPREAD SPECTRUM SIGNAL RECEIVER; and Application Ser. No. 06/592,667, filed on Mar. 23, 1984 and entitled SYNCHRONIZATION SYSTEM FOR USE IN DIRECT SEQUENCE SPREAD SPECTRUM SIGNAL RECEIVER.

TECHNICAL FIELD

The invention relates generally to direct sequence spread spectrum code division multiplexers, and more particularly toward a method of correcting timing signal errors which may occur between transmitters and receivers in such a system.

BACKGROUND ART

In a spread spectrum system, a transmitted signal is spread over a frequency band that is much wider than the minimum bandwidth required to transmit particular information. Whereas in other forms of modulation, such as amplitude modulation or frequency modulation, the transmission bandwidth is comparable to the bandwidth of the information itself, a spread spectrum system spreads an information bandwidth of, for example, only a few kilohertz over a band that is many magahertz wide, by modulating the information with a wideband encoding signal. Thus, an important characteristic distinguishing spread spectrum systems from other types of broadband transmission systems is that in spread spectrum signal processing, a signal other than the information being sent spreads the transmitted signal.

Spreading of the transmitted signal in typical spread spectrum systems is provided by (1) direct sequence modulation, (2) frequency hopping or (3) pulsed-FM or "chirp" modulation. In direct sequence modulation, a carrier is modulated by a digital code sequence whose bit rate is much higher than the information signal bandwidth. Frequency hopping involves shifting the carrier frequency in discrete increments in a pattern dictated by a code sequence, and in chirp modulation, the carrier is swept over a wide band during a given pulse interval. Other, less frequently used, carrier spreading techniques include time hopping, wherein transmission time, usually of a low duty cycle and short duration, is governed by a code sequence and time-frequency hopping wherein a code sequence determines both the transmitted frequency and the time of transmission.

Applications of spread spectrum systems are various, depending upon characteristics of the codes being employed for band spreading and other factors. In direct sequence spread spectrum systems, for example, wherein the code is a pseudo-random sequence, the composite signal acquires the characteristics of noise, making the transmission undiscernable to an eavesdropper who is not capable of decoding the transmission. Additional applications include navigation and ranging with a resolution depending upon the particular code rates and sequence lengths used. Reference is made to the textbook of R. C. Dixon, *Spread Spectrum Systems,* John Wiley and Sons, New York, 1976. especially Chapter 9 for application details.

Direct sequence modulation involves modulation of a carrier by a code sequence of any one of several different formats, such as AM or FM, although biphase phase-shift keying is the most common. In biphase phase-shift keying (PSK), a balanced mixer whose inputs are a code sequence and an RF carrier, controls the carrier to be transmitted with a first phase shift of $X°$ when the code sequence is a "1" and with a second phase shift of $(180+X)°$ when the code sequence is a "0". Biphase phase-shift keyed modulation is advantageous over other forms because the carrier is suppressed in the transmission making the transmission more difficult to receive by conventional equipment and preserving more power to be applied to information, as opposed to the carrier, in the transmission. Characteristics of biphase phase-shift keying are given in Chapter 4 of the Dixon test, supra.

The type of code used for spreading the bandwidth of the transmission is preferably a linear code, particularly if message security is not required, and is a maximal code for best cross correlation characteristics. Maximal codes are, by definition, the longest codes that could be generated by a given shift register or other delay element of a given length. In binary shift register sequence generators, the maximum length (ML) sequence that is capable of being generated by a shift register having n stages is $2^n-1$ bits. A shift register sequence generator is formed from a shift register with certain of the shift register stages fed back to other stages. The output bit stream has a length depending upon the number of stages of the register and feedback employed, before the sequence repeats. A shift register having five stages, for example, is capable of generating a 31 bit binary sequence (i.e. $2^5-1$), as its maximal length (ML) sequence. Shift register ML sequence generators having a large number of stages generate ML sequences that repeat so infrequently that the sequences appear to be random, acquiring the attributes of noise, and are difficult detect. Direct sequence systems are thus sometimes called "pseudo-noise" systems.

Properties of maximal sequences are summarized in Section 3.1 of Dixon and feedback connections for maximal code generators from 3 to 100 stages are listed in Table 3.6 of the Dixon test. For a 1023 bit code, corresponding to a shift register having 10 stages with maximal length feedback, there are 512 "1"s and 511 "0"s; the difference is 1. Whereas the relative positions of "1"s and "0"s vary among ML code sequences, the number of "1"s and the number of "0"s in each maximal length sequence are constant for identical ML length sequences.

Because the difference between the number of "1"s and the number of "0"s in any maximal length sequence is unity, autocorrelation of a maximal linear code, which is a bit by bit comparison of the sequence with a phase shifted replica of itself, has a value of $-1$, except at the 0±1 bit phase shift area, in which correlation varies linearly from −1 to ($2^n-1$). A 1023 bit maximal code ($2^n-1$) therefore has a peak-to-average autocorrelation value of 1024, a range of 30.1 db.

It is this characteristic which makes direct sequence spread spectrum transmission useful in code division multiplexing. Receivers set to different shifts of a common ML code are synchronized only to transmitters having that shift of the common code. Thus, more than one signal can be unambiguously transmitted at the same frequency and at the same time. In an autocorrelation type multiplexed system, there is a common clock or timing source to which several transmitters and at least one receiver are synchronized. The transmitters generate a common maximal length sequence with the code of each transmitter phase shifted by at least one bit relative to the other codes. The receiver generates a local replica of the common transmitted maximal length sequence having a code sequence shift that corresponds to the shift of the particular transmitter to which the receiver is tuned. The locally generated sequence is autocorrelated with the incoming signal by a correlation detector adjusted so as to recognize the level associated with only ±1-bit synchronization to despread and extract information from only the signal generated by the predetermined transmitter.

Because the autocorrelation characteristic of a maximal length code sequence has an offset corresponding to the inverse of the code length, or $$V/(2^n-1)$$

where V is the magnitude of voltage corresponding to "1" and n is the number of shift register stages, overlap occurs in neighboring channels. Thus, there is imperfect rejection of unwanted incoming signals. Unambiguous signal discrimination thus requires a guard band between channels reducing the number of potential transmitters for a given code length. A long maximal length sequence compensates for the guard band to increase the number of potential transmitters, but this slows synchronization and creates power imbalance of the multiplexing transmitters.

In one type of code division multiplexer a plurality of transmitters synchronized to a common clock each transmit a data signal spread by a common bipolar pseudo-random code having a different assigned code sequence shift. A receiver, synchronized to the clock, discriminates the signal transmitted by a predetermined transmitter from signals transmitted by the others by cross-correlating the incoming signal with a trinary sequence that is developed at the receiver. The receiver develops the trinary sequence by generating a first pseudo-random code that is a replica of the common bipolar pseudo-random code transmitted by the transmitters and having a code sequence shift corresponding to that of the predetermined transmitter to which the receiver is tuned, and a second bipolar pseudo-random code that is a replica of the common bipolar pseudo-random code and has an unassigned code sequence shift.

Correlation consists of multiplication of an incoming signal with the local reference signal that corresponds to the difference between the first and second bipolar pseudo-random code sequences. Integration of the product averages out random noise to enhance the signal-to-noise ratio. When the information transmitted is binary, two different waveforms are generated: one for a "zero" and another for a "one" at the receiver. When the transmitted signal is biphase, the transmitted waveforms for a "one" and a "zero" differ from each other by a 180° phase shift. When the predetermined transmitter and the receiver are synchronized with each other, the multiplier output is at a maximum at a positive polarity for a "one" and a negative polarity for a "zero". The multiplier output is integrated for the duration of 1-bit period. If the initial integrator output is "zero" then the polarity of the integrator output at the end of a bit period corresponds to the transmitted binary information.

The degree of correlation between the predetermined transmitter and the receiver is determined by comparing the outputs of several correlation detectors having reference signals that are displaced in time with each other. Each detector develops two output signals, an in-phase signal that is at a maximum and a quadrature-phase signal that is at a minimum when the receiver and predetermined transmitter are aligned. The receiver is fine tuned to the predetermined transmitter by adjusting the receiver timing until the quadrature-phase signal is minimized.

During fine tuning of the receiver, a decision is made on each incoming sequence bit whether to advance or retard receiver timing by an equal fraction of a code chip. The receiver timing is advanced by the code chip fraction if the in-phase and quadrature-phase correlation signals are of opposite polarity. If the in-phase and quadrature-phase correlation signals are of the same polarity, the receiver timing is retarded.

During perfect correlation between the receiver and predetermined transmitter, however, the fine tuning mechanism of the receiver tends to drive the receiver timing from the optimum reception point, causing the receiver to continually search for correct synchronization, since there is no deadband. Further, because there is a delay inherent in the feedback loop of the receiver, the correction decision is made using information more than one data bit old, causing the receiver to tend to overshoot as it attempts to lock in the optimum synchronization point.

As another problem, a direct sequence spread spectrum receiver does not readily distinguish between a signal and noise, particularly since the incoming signal is a data modulated carrier that is spread by a pseudo-noise sequence. The receiver will thus tend to attempt to lock onto noise in the absence of a signal.

DISCLOSURE OF INVENTION

It is accordingly one object of the invention to improve synchronization in a direct sequence spread spectrum receiver.

A further object is to improve receiver synchronization in a direct sequence spread spectrum receiver in which the data sampling rate can be higher than the timing signal frequency.

These and other objects are satisfied by the method of the present invention which improves the synchronization between a transmitter and a receiver used in a direct sequence spread spectrum code division multiplex system, and in particular where a plurality of transmitters and at least one receiver are synchronized to a common timing signal source. Each transmitter transmits a data signal spread by a pseudo-random code which is a different assigned shift of a common code sequence. The receiver is synchronized to one of the transmitters transmitting a data signal spread by the pseudo-random code having a predetermined assigned code sequence and to the timing signal source by the steps of sampling the data signal at a rate equal to the frequency of the timing signal source or an integral multiple thereof, combining one or more consecutive data samples together to generate a data sample point corresponding to a particular timing point of the timing signal source, detecting which one of the data sample points has a maximum value, and locking the receiver to the timing point of the timing signal source corresponding to which one of the data sample points is detected as having a maximum value.

An advantage of the above method is that it eliminates the need for redundant data channels sampling each point of possible synchronization ambiguity. Further, the above method allows data sampling to take place at a rate faster than the frequency of the timing signal source. By combining together consecutive data samples to generate a data point, data sampling may take place at a rate greater than the net data rate, which is in effect the number of data sample points or bits (generated from the combination of one or more consecutive data samples) per second. This arrangement allows the data samples to be combined digitally (for example in a microprocessor) and allows the data rate to be independent of the actual hardware timing.

Still other objects and advantages of the present invention will become readily apparent to those skilled in this art from the following detailed description, wherein there is shown and described only the preferred embodiment of the invention, simply by way of illustration of the best modes contemplated of carrying out the invention. As will be realized, the invention is capable of other and different embodiments, and that several details are capable of modification in various, obvious respects, all without departing from the invention. Accordingly, the drawings and description are to be regarded as illustrative in nature, and not as restrictive.

BRIEF DESCRIPTION OF THE DRAWINGS

FIG. 11 illustrates an analog embodiment of multiple correlation detectors for determining the degree of correlation in accordance with the invention;

FIG. 15 is a digital implementation of one channel of the circuit shown in FIG. 11;

FIG. 16 is an N-channel generalization of the circuit implementation in FIG. 15;

FIG. 17 shows another digital implementation of a single channel correlator of a type shown in FIG. 11;

FIGS. 20(a) and 20(b) are flow charts showing two alternative methods for performing fine tuning of the receiver;

FIGS. 22(a) and 22(b) are flow charts respectively showing methods for correcting receiver timing and for performing signal presence detection;

FIG. 23 is a flow chart showing one technique for performing coarse tuning of the receiver;

FIGS. 24(a)-24(e) are timing diagrams showing the relationship of timing pulses between a transmitter and a receiver;

BEST MODE FOR PRACTICING THE INVENTION

General

In spread spectrum communications, spreading of signal bandwidth beyond the bandwidth normally required for data being transmitted is accomplished by first phase shift keyed (PSK) modulating a carrier waveform by data to be transmitted, and then modulating the resultant signal by a reference pseudo-random code of length L running at a repetition rate which is normally at least twice the data rate. Forms of modulation other than PSK can be applied to modulate the carrier as well as to spread the composite signal, although PSK is preferred for reasons set forth earlier.

To demodulate the signal transmission, the received signal is heterodyned or multiplied by the same reference code as the one used to spread the composite transmission, and assuming that the transmitted and locally generated receiver codes are synchronous, the carrier inversions caused by the code PSK modulation at the transmitter are removed and the original base-band modulated carrier is restored in the receiver.

Figure 1:
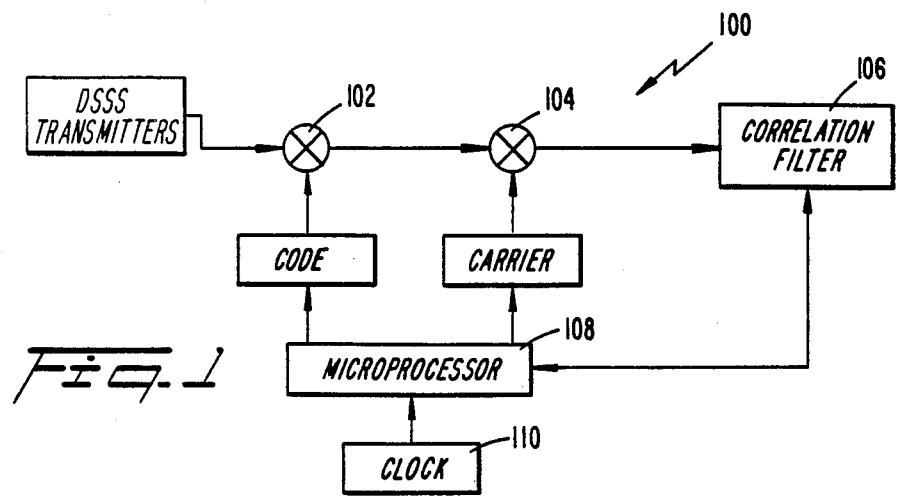
FIG. 1 is a simplified block diagram showing a DSSS code division multiplex receiver.

FIG. 1 illustrates the fundamental elements of a basic spread spectrum receiver incorporating one aspect of the invention. Receiver 100 receives a direct sequence spread spectrum (DSSS) signal transmitted by a particular transmitter among a plurality of such transmitters, and processes the received signal to discriminate the signal transmitted by the particular transmitter from among the signals transmitted by all the transmitters. Bearing in mind that the received signal is essentially modulated twice, that is, the carrier is modulated with data and then the composite is modulated by a pseudo-random code sequence to spread the composite over a bandwidth that is comparable to the bandwidth of the pseudo-random sequence, receiver 100 provides two stages of demodulation of the received signal to extract the transmission data. The received DSSS signal is first heterodyned or multiplied by the code of the particular transmitter whose signal is being discriminated from among the others. Thus, assuming that the codes generated at the transmitter and receiver are synchronous, the carrier inversions caused by the code PSK modulation at the transmitter are removed at multiplier 102, and the original base-band modulated carrier is restored. The narrow-band restored carrier is applied to a band pass filter (not shown) designed to pass only the base-band modulated carrier. Base-band data are then extracted by heterodyning or multiplying the restored carrier by a locally generated carrier at multiplier 104. The output of multiplier 104 is applied to a conventional correlation filter 106, such as an integrate and dump circuit, followed by a sample and hold circuit which develops signals corresponding to the transmitted data.

The receiver 100 is controlled by a standard microprocessor 108, synchronized to a system clock 110, to which the transmitters are also synchronized. Because the noise and undesired transmissions are treated in the same process of multiplication in multiplier 102 by the locally generated reference code that compresses the received direct sequence signal into the original carrier bandwidth, any incoming signal not synchronous with the locally generated reference code is spread into a bandwidth equal to the sum of the bandwidth of the incoming signal and the bandwidth of the reference code. Since this unsynchronized input signal is mapped into a bandwidth that is at least as wide as the reference code, a base pass filter can reject a significant amount of the power of an undesired signal. This is the significance of a DSSS system: synchronous input signals at the reference code modulated bandwidth are transformed to the base-band modulated bandwidth, whereas non-synchronous input signals remain spread over the code-modulated bandwidth.

Synchronization processing makes use of a property inherent in the particular code that is employed at the transmitter. The autocorrelation of a maximal length (ML) sequence, that is, multiplication of the sequence by a time shifted replica of itself, is at a peak when synchronization is achieved and has an absolute value that drops to $-P^2/L$, where P is the magnitude of the code sequence and L is the code length, as synchronization becomes lost (i.e., the time difference between the code and its replica approaches a code chip or greater). The sign of the autocorrelation pattern is dependent upon the data bit being used to modulate the transmitter. It is thus possible to recover the transmitted data at the receiver by monitoring the sign of the autocorrelation output when the receiver and transmitter are properly synchronized.

Figure 2:
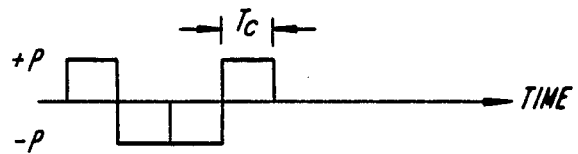
FIG. 2 is a representation of a bipolar pseudo-random pulse sequence.

Referring to FIG. 2, a pseudo random code sequence of a type to which receiver 100 is tuned is bipolar, that is, it is assumed to switch polarities of a constant voltage power supply. In the invention, bipolar, rather than unipolar, sequences are used to improve power transmission efficiency, since the carrier is suppressed in bipolar transmission. Bipolar transmission also avoids high concentrations of energy in any frequency band to help avoid interference between transmissions by different transmitters in the system. Each bipolar sequence has a magnitude P and a chip duration $T_c$. The length of the ML sequence depends upon the number of different transmitters whose signals are to be code-division multiplexed within the system. Each transmitter is assigned the same transmission code having a different specified chip of the common ML sequence. The maximum number of transmitters that are capable of being multiplexed within this system thus corresponds to the length of the ML sequence.

The number of transmitters that may be multiplexed without interference within a code-division multiplex system of this type is equal, theoretically, to the bit length of the sequence. For an ML code having a length of 63 bits, for example, the transmission channel is theoretically capable of multiplexing 63 different transmitters. This assumes that synchronization is deemed to be achieved between the receiver and a preselected transmitter when the autocorrelation between the code received from the transmitter and the locally generated code, both synchronized to a common timing source, is at a peak. In practice, however, the number of transmitters that can be code division multiplexed in the system is much lower than the theoretical maximum, because there is overlap between neighboring correlation curves due to the $-P^2/L$ term in the autocorrelation of the ML sequence. This can be better appreciated with reference to FIG. 3 which shows a correlation curve for a single transmission and FIG. 4 which shows a number of correlation curves for neighboring transmissions, that is, for transmissions that are time offset from each other by a single code chip.

Figure 3:
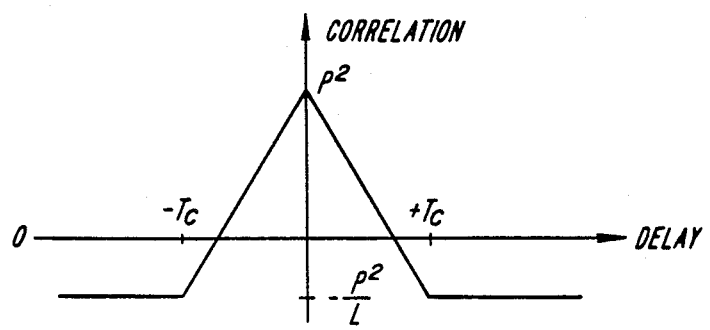
FIG. 3 is a diagram showing an autocorrelation pattern for a bipolar pseudo-random pulse sequence of the type shown in FIG. 2.

In FIG. 3, the correlation curve has a magnitude $-P^2/L$ when the transmitted and locally generated code sequences are time offset from each other by greater than a code chip $T_c$, where P is the absolute magnitude of the sequence and L is the sequence length in bits. When the transmitted and locally generated codes are near synchronization, that is, are within a time offset of one code chip of each other, the correlation increases in magnitude to a peak of $P^2$ at perfect synchronization. Thus, synchronization between the receiver and a single transmitter can be detected by monitoring the correlation output and deeming synchronization to exist when the correlation signal is above a predetermined positive value.

Figure 4:
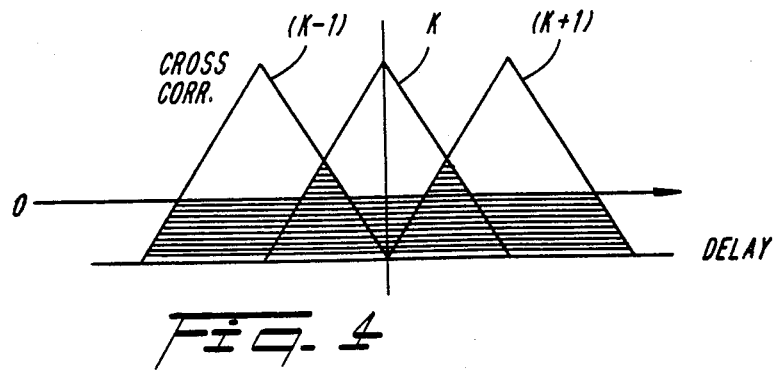
FIG. 4 is a superposition of several autocorrelation patterns corresponding to neighboring transmitters in a code division multiplex system.
Figure 5:
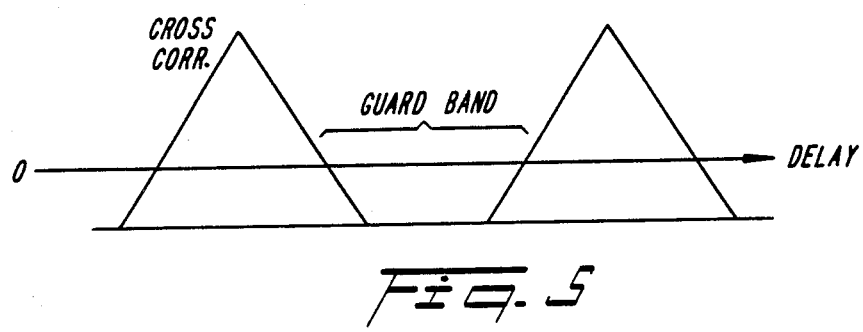
FIG. 5 is a diagram corresponding to FIG. 4, with signals of neighboring transmitters separated by guard bands.

Referring now, however, to FIG. 4, assume that there are three transmitted code sequences k, k−1 and k−1, time shifted from each other by a single code chip. Each correlation has a positive peak value of $P^2$ and a negative peak value of $-P^2/L$, as in FIG. 3. The correlation curves of neighboring code sequences overlap, within the regions shown by cross-hatching in FIG. 4. In those regions, neighboring code sequences have common correlations, making it impossible to distinguish between transmissions. As a practical matter, to avoid interference between transmissions, it is necessary to insert a guard band between sequences, as shown in FIG. 5. This is provided by assigning transmissions to sequence shifts corresponding only to alternate code chip delays, rather than to every code chip delay as in FIG. 4. The result is that, at best, only one-half the number of transmissions, compared to the theoretical maximum number, can be multiplexed. In practice, even fewer than one-half the theoretical maximum transmitters are capable of being multiplexed in a code division multiplex system using bipolar sequences because a guard band that is greater than that provided using only alternate code shift delays is required to avoid synchronization ambiguities.

In accordance with one aspect of the invention, the number of transmitters that are capable of being multiplexed is increased to one less than the theoretical limit by cross-correlating the input signal with a trinary code developed by obtaining the difference between the code sequence assigned to the particular transmitter to which the receiver is tuned and a code sequence that is unassigned. In other words, two bipolar code sequences are developed at the receiver. One of the codes is the replica of the common code sequence transmitted by all the transmitters and has a sequence shift that corresponds to the sequence shift of a predetermined one of the transmitters. The second code is a replica of the common bipolar sequence and has a code sequence shift that is not assigned to any of the transmitters. One of the locally generated codes is subtracted from the other, and the resultant, which is a trinary code sequence, is correlated with the incoming signals. The sequence shift of the trinary code sequence is brought to within one code chip of the sequence generated by the preselected transmitter, using a static synchronization technique to be described below. Perfect synchronization between the receiver and preselected transmitter is obtained using dynamic synchronization, also to be described in detail below, obtained generally by successively shifting the timing of the receiver by a fraction of a code chip and monitoring the output of the correlator. When the correlation output is at a peak, the receiver and preselected transmitter are considered to be synchronized to each other. Assuming now that the receiver and transmitter are also synchronized to corresponding clock pulses (i.e., the transmitter is not synchronized to one clock pulse and the receiver synchronized to another), the polarity of the correlation output is monitored to extract the transmitted data.

Figure 6A:
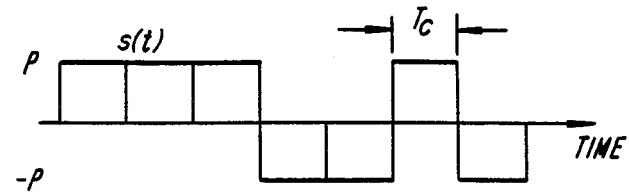
FIGS. 6(a)-6(d) are wave forms showing trinary code generation.
Figure 6B:
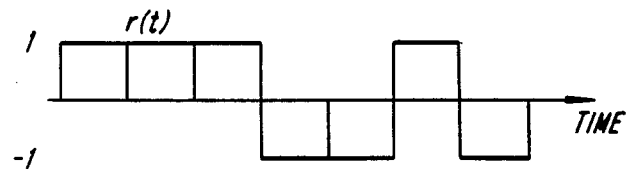

Development of the trinary pulse sequence to be cross-correlated with the transmitted sequences is better understood with reference to FIGS. 6(a)–6(d). In FIG. 6(a), a transmitted bipolar sequence s(t) having an absolute magnitude P and chip period $T_c$ is shown. This sequence is a simplification of an actual sequence which, in practice, would be substantially longer, e.g., 63 bits. Within the receiver is developed a first reference pulse sequence r(t) shown in FIG. 6(b). The sequence r(t) is identical to the sequence s(t) transmitted by the predetermined transmitter shown in FIG. 6(a), because the transmitter and receiver sequences have the same delay and are presumed synchronized to each other.

Figure 6C:
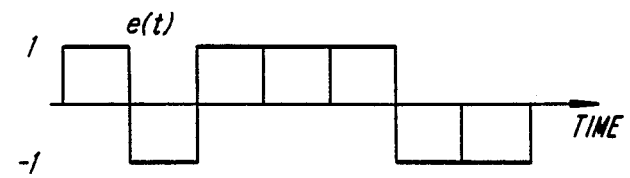

The receiver generates a second reference pulse sequence e(t), shown in FIG. 6(c), which is the same sequence as the one transmitted by the preselected transmitter as well as by all the other transmitters but has a sequence delay that is not assigned to any of the transmitters.

Figure 6D:
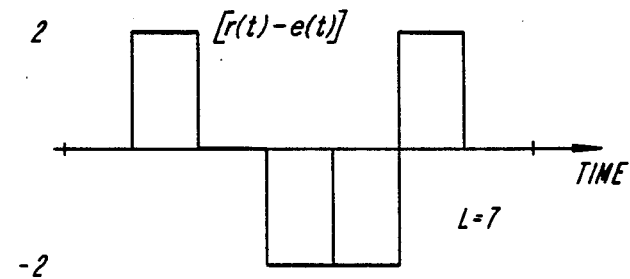

The difference [r(t)−e(t)] between the two locally generated reference pulse sequences is obtained, to provide the trinary pulse sequence shown in FIG. 6(d). The trinary sequence has a value [+2, 0, −2], depending upon the relative binary values of the two reference pulse sequences r(t) and e(t).

It is to be understood that the sequence length in the example shown in FIG. 6 is 7 bits, although in practice, much longer sequences would be applied to accommodate a relatively large number of transmitters to be code division multiplexed.

Figure 7:
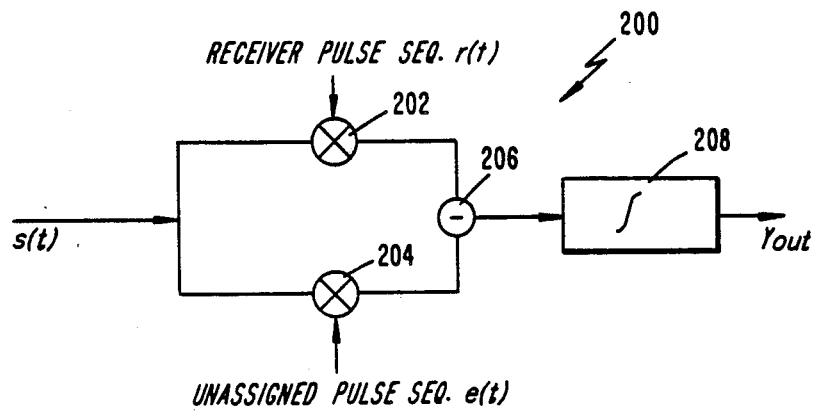
FIG. 7 is a simplified block diagram showing a receiver operated in accordance with the principles of the invention.

Referring to FIG. 7, development of the trinary reference sequence to be cross-correlated with incoming bipolar pulse sequences for signal demultiplexing is provided in a receiver 200. The receiver 200 receives the transmitted pulse sequences s(t) and applies the incoming sequences to the inputs of a first correlation multiplier 202 and a second correlation multiplier 204. The first correlation multiplier 202 multiplies the incoming sequences s(t) by the locally generated reference pulse sequence r(t) having a sequence shift corresponding to the sequence shift of the preselected transmitter. The multiplier 204 multiplies the incoming sequences s(t) by the pulse sequence e(t) having an unassigned pulse sequence shift. The resultant multiplication products are applied to a difference circuit 206, and the difference is integrated and sampled in a standard correlation filter 208 to develop an output signal $y_{out}$.

It is pointed out that in FIG. 7, the input sequences s(t) are first multiplied respectively by the two reference pulse sequences r(t) and e(t), and then the product difference is obtained in difference circuit 206. This is equivalent to obtaining the difference between the two reference pulse sequences r(t) and e(t) and then multiplying the difference by the incoming sequences s(t).

Figure 8:
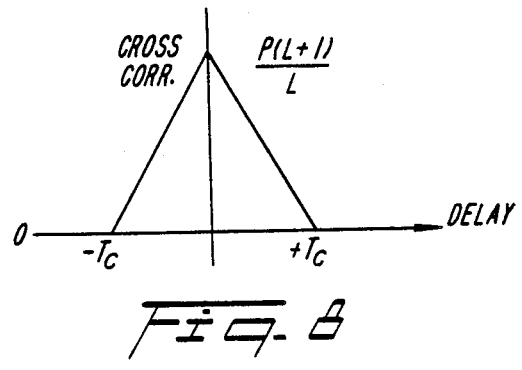
FIG. 8 is a diagram showing an idealized cross-correlation pattern between a locally developed trinary code sequence and an incoming binary code sequence in accordance with the invention.

The resultant cross-correlation is shown in FIG. 8. Note that each correlation curve has a value 0 when the preselected transmission and locally generated reference sequence r(t)−e(t) are displaced from each other by more than one code chip. This contrasts with the cross-correlation curve of FIG. 3, wherein there is a negative residual correlation having a magnitude $P^2/L$. The magnitude of the correlation curve increases linearly to a peak value of $P(L+1)/L$ when the preselected transmitted and locally generated reference pulse sequences are synchronized.

Figure 9A:
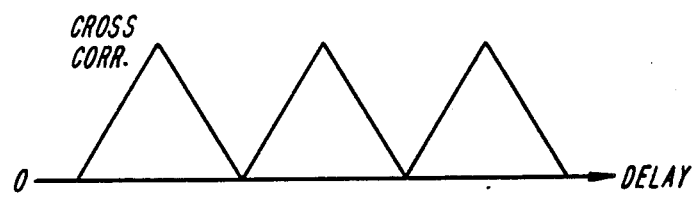
FIGS. 9(a)-9(c) are diagrams showing correlation patterns developed by multiple channel correlation detectors in accordance with various embodiments of the invention.

The advantage of this correlation strategy is appreciated by comparing FIG. 9a showing the correlations of a number of neighboring transmissions in accordance with the invention and FIG. 4. In particular, FIG. 9a shows codes with a separation of 2 code chips. However, it will be appreciated that the FIG. 9a transmissions can be displaced from each other by a single code shift and that there is no overlap between the correlations of adjacent transmissions, whereas in FIG. 4, overlap occurs in the cross-hatched portions. The invention thus enables the number of transmissions capable of being multiplexed to be equal to one less than the length of the pulse sequence in bits, a result that is not possible using prior art systems. Even if a guard band is placed between transmissions in the strategy shown in FIG. 9a, the number of transmissions that can be reliably multiplexed is substantially greater than the number that can be reliably multiplexed using the correlation strategy shown in FIG. 4.

Assume that the code-division multiplexed PSK signal Y(t) incoming at the receiver is expressed as follows:

$$Y(t) = \sum_{j=1}^{N} P_j d_j X_j(t) \cos(W_c t + 0) + N(t) \tag{1}$$

where for J incoming transmissions:

$0 \leq t \leq T$, where T is a code chip period;

$P_j$ is the power within each incoming bipolar pulse sequence;

$d_j$ is the polarity or sign of each corresponding incoming sequence;

$X_f(t)$ is the transmitted data;

$W_c$ is the frequency of the carrier in radians;

0 is the carrier phase; and $N(t)$ is noise.

The output $V_A(T)$ of the conventional receiver, using a single reference code sequence, is defined by the following:

$$V_A(T) = P_r d_r + \frac{1}{L} \sum_{\substack{j=1 \\ j \neq r}}^{N} P_j d_j + N_A \qquad (2)$$

where:

$P_r$ is the power of the desired incoming sequence;

$d_r$ is the data sign of the desired sequence;

L is the pulse sequence length in bits;

$P_j$ is the power of each of the undesired sequences;

$d_j$ is the corresponding data sign of the undesired sequence; and $N_A$ is noise.

The output $V_B(T)$ of the receiver operating in accordance with the principles of the invention is defined as follows:

$$V_B(T) = P_r d_r (1 + 1/L) + N_B \qquad (3)$$

Because the correlation method of the invention involves a subtraction of a code sequence having an unassigned code sequence shift, all undesired transmission components (identified by the subscript "r") in the output $V_B(T)$ are perfectly rejected, whereas in the prior art receiver, the output $V_A(T)$ involves contributions of the undesired transmissions (having the subscript "j") as well as the desired transmissions (subscript "r").

Multiplexer trinary signal correlation induces an additional three decibels of degradation in data signal-to-noise demodulation with respect to white noise appearing at the receiver input, compared to conventional correlation using only the particular transmission binary pulse sequence. Thus, $$\overline{N}_A = \overline{N}_B = 0 \, \overline{N}_b^2 = 2(1 + 1/L) \overline{N}_A^2. \qquad (4)$$

The multiplexing strategy discussed above results in perfect unwanted access rejection capability using ML codes of any length in a code-division multiplex system. In the past, only ML codes of sufficiently long length were potentially usable with the number of allowable multiplexers being much less than the code length. Even there, power imbalances of the multiplexing transmitters occurred.

Figure 9B:
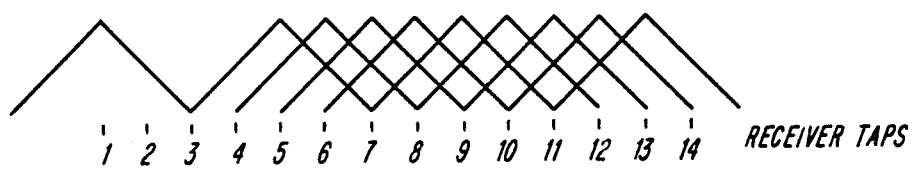

Additionally, the ideal cross correlation pattern in FIG. 9a lends itself to multiplexing schemes using more than the theoretical limit of code, each time-offset by less than a code chip, and assuming a more complex receiver configuration. For example, it has been discovered that the number of transmitters which could be multiplexed can be increased to $2 \times (L-2)$ channels by adding a code between each of the code sequences shown in FIG. 4, with only a slight trade off in overall receiver signal-to-noise performance. As shown in FIG. 9b an additional code can be inserted between each of the codes shown in FIG. 4. The codes are detected at a plurality of taps provided at the receiver. The outputs of the various receiver taps shown in FIG. 9b are as follows:

TABLE I 1. extra code
2. ½ extra code
3. null
4. ½ code 1
5. code 1 + ½ code 1'
6. ½ code 1 + code 1' + ½ code 2
7. ½ code 1' + code 2 + ½ code 2'

The sequence of equations may then be solved for each channel:

channel 1 = 2 × tap 4
channel 1' = 2 × (tap 5 - channel 1)
channel 2 = 2 × (tap 7 - channel 1' - tap 4)
channel 2' = 2 × (tap 7 - channel 2 - tap 5)
"
"
channel L' = 2 × tap (2L + 3)

In practice, the above arrangement would be somewhat difficult to implement due to both noise and synchronization problems. An alternative implementation would require that a null of the carriers occurred at the point where the correlation envelope is equal to ½ the maximum. In such an arrangement, the equations for the outputs of the taps become:

TABLE II 1. extra code
2. null
3. null
4. null
5. code 1
6. code 1'
7. code 2

This arrangement allows for full data recovery without interference. However, it may still be somewhat susceptible to noise.

Figure 9C:

In order to overcome the above problems, there is shown in FIG. 9c an arrangement in which two or more code sequences are grouped together and separated by guard-bands. The exact separation of the groups or the patterns comprising the groups is independent of this arrangement. This approach also allows the grouping of transmitters with similar characteristics and simplifies synchronization problems.

Any additional modulation by data bearing signals and that necessary for improved communication between transmitters and receivers can be incorporated in the above described strategies. The only condition required is that any additional modulation must not destroy the necessary timing of the shifted pulse sequences thereby maintaining receiver multiplexing sensitivity.

Synchronization - General

The receiver and preselected transmitter must be time synchronized to each other before data can be extracted. Assuming that the receiver and transmitter are synchronized to a common timing source (if the commercial power line is the transmission medium, common timing can be obtained from the 60 Hertz power source), synchronization is a matter of adapting receiver timing to different propagation delays of the transmitted signal as well as to the timing signal and to delays inherent in the transmitter and receiver. Some of these delays are fixed, and can be compensated using a "static" delay, to synchronize the receiver and predetermined transmitter to within one code chip of each other, wherein a chip is defined as the bit period of the pseudo-random code generator.

In general, static delay can be compensated during initial calibration of the receiver, since most static delays are fixed. A difficulty occurs, however, when the transmission medium is a transmission line with the transmitter and receiver synchronized to a common timing source, and wherein communication between the two units is bidirectional. Static delay must thus be examined from two reference points, one where the transmitter is at the timing source and the other where the receiver is at the timing source.

With the transmitter located at the timing source and the receiver located elsewhere, the timing signal and transmitted signal will propagate at approximately the same speed from the transmitter to the receiver. Other timing variations between the transmitter and receiver are due to delays induced within the transmitter and receiver circuitry, and can be preset to synchronize the transmitter and receiver to within one code chip of each other. All receivers remote from the timing source can thus have identical static delays.

If the receiver is located at the timing source and the transmitter is located elsewhere, however, each receiver may require a static delay that is unique for each remote transmitter to account for different signal propagation distances. Thus, to enable a receiver to receive signals from a multiplicity of transmitters, the static delay of the receiver must be variable. In practice, the static delay between each transmitter and the receiver is measured upon installation of the transmitter; that static delay value for all future communications with a particular transmitter is preset within the receiver. Whenever a transmission is received from that transmitter, to obtain united synchronization of the transmitter, receiver timing is automatically adjusted to accommodate the delay associated with the particular transmitter.

In one embodiment of the invention, there are a plurality of transmitter/receiver units disposed in a so-called "master/slave" arrangement. In this arrangement, one transmitter/receiver unit, called the master station, acts as the source of timing signals for the other stations (slave units). The amount of delay associated with the timing signals between the master station and each of the slave stations includes such things as the filter delay for the timing signal source at the master station, the received filter delay at the master station, the signal propagation delay between the master and a particular slave, the coupling delay at the master station and the transmit filter delay at the master station. Knowledge of these various delays will give an estimate of the amount of static delay associated between the master station and a particular slave station. However, some variation in each delay will occur with changes in the transmission line associated with temperature changes, transmission frequency, etc.

While dynamic delay adjustments can take care of most of these changes in the static delay characteristics between the master and slave units, the multiplexing capabilities of the system may be somewhat reduced because the receiver at a particular master or slave unit must be capable of tracking delay variations over a range of several code chips. This requires a guard band that is wide enough to allow the signals of two adjacent receivers to vary in time over their associated bands without interference.

However, it has been discovered that the amount of required guard band may be reduced by periodically measuring, at the master station, the static delays associated with signal transmission between the master station and each of the slave stations and then periodically adjusting the transmitter signal timing at the slave in order to bring the static delay back into a desired range. This allows more slave stations to transmit at one time since the guard band required for delay variations can be greatly reduced thus allowing more usable code delays for multiplexing.

Variations from synchronization established by the static delay are compensated by a dynamic delay mechanism within each receiver. The dynamic delay consists of two stages: fine tuning and coarse tuning. Whereas static delay timing causes the receiver and predetermined transmitter to be synchronized to each other to within one code chip, fine tuning uses correlation detection to make fine adjustments in receiver timing as a function of received transmission, rather than as a function of an expected transmission (static delay).

After fine tuning has established that receiver timing is at a local correlation peak, it becomes necessary to determine if the local peak to which the receiver is timed is the "correct" local peak for best correlation. This is necessary because, depending upon the correlation properties of the code selected, as well as other factors, there are likely to be multiple correlation peaks, with the primary local peaks having the greatest peak magnitude. These multiple peaks arise from carrier correlation within the $+1T_c$ code correlation peak. Finally, it must be determined which of the system timing pulses present in each data bit is the proper one for synchronization. Without such a determination, a condition can exist wherein the transmitter is locked to one timing pulse while the receiver is locked to another timing pulse. This is because these are two timing pulses in a data period and incorrect timing causes a quadrature condition between transmitter and receiver data periods. Thus, the net energy for such quadrature data periods is zero. Even with the receiver and transmitter properly synchronized to each other, data cannot be extracted from the received sequence because it is not possible to detect and decode the data transmission unless the receiver and transmitter are locked to the same timing pulses. Fine tuning and coarse tuning as well as synchronization to the proper timing pulse within each data bit shall now be described in more detail.

Figure 10:
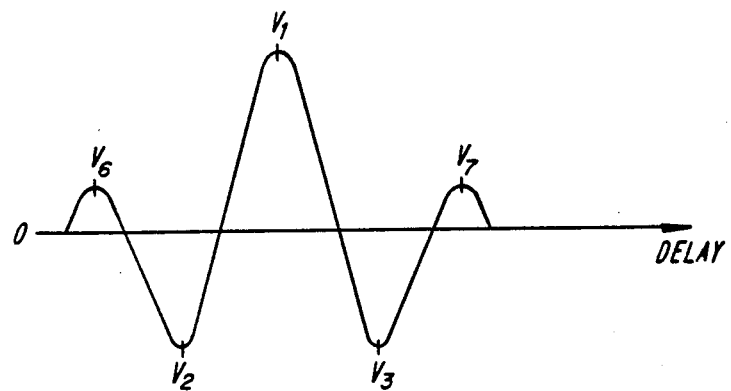
FIG. 10 illustrates an actual correlation pattern obtained in the receiver of the present invention when operated in the presence of various degrading factors.

FIG. 10 illustrates the correlation pattern obtained by cross-correlating an incoming, bi-polar pulse sequence together with its carrier and the locally generated trinary reference sequence. The correlation pattern has a major peak at receiver timing V1 and has minor correlation peaks at receiver timings V2, V3, V6 and V7, referred to hereinafter as "channels". The correlation peak at primary channel V1 depends upon the correlation properties of the code selected as a function of code chip time delay difference between the incoming code sequence and the reference code sequence. The correlation is at a peak when synchronization between the receiver and transmitter is achieved, with the absolute value of the correlation dropping to zero as the synchronization difference approaches a code chip or greater. It should be noted that, due to imperfect correlation properties of the code and due to the influence on correlation by the sinusoidal carrier, the correlation shown in FIG. 10 is approximately sinusoidal as compared to the piece-wise linear, ideal correlation profile shown in FIG. 9a which does not include a carrier. This is the reason that coarse tuning is required; fine tuning adjusts receiver timing until a correlation peak is determined; coarse tuning then determines whether the correlation peak is the major correlation peak associated with channel VI or is a minor correlation peak associated with channels V2, V3, V6 or V7, or others.

In accordance with one aspect of the invention, synchronization of the receiver is achieved by providing a plurality of separate sub-receivers or correlation detectors that are tuned to each receiver channel. Assuming that each of the channels V1, V2, V3, V6 and V7 are spaced apart from each other in time by one third of a code chip, fine tuning adjusts the receiver timing such that the channels are all located at local peaks. Furthermore, assuming that channel V1 is within a code chip of being synchronized, the channel V1 is within one sixth of a code chip of a local peak. The outputs of the correlation detectors are applied to a microprocessor 314, described below, to develop a receiver timing signal for synchronization to the transmitter and to extract transmission data. Various embodiments of the multiple correlation detectors are illustrated in FIGS. 11–18.

Correlation Detection

One embodiment of the multiple channel correlation detector shown in FIG. 11 is generalized for N correlation channels. The multiple channel correlation circuit identified generally by 300 comprises for each channel a correlator 302 each comprising a first multiplier 304, a second multiplier 306 and a difference circuit 308. The first multiplier 304 has one input that receives the incoming sequences s(t) and a second input that receives the first locally generated reference sequence r(t) having a sequence shift that corresponds to the sequence shift of a predetermined transmitter. The multiplier 306 has one input that receives incoming sequences s(t) and a second input that receives the second reference sequence e(t) having an unassigned sequence shift. The outputs of the two multipliers 304 and 306 representing, respectively, the products of the incoming sequences and the two locally generated reference sequences are applied to the inputs of difference circuit 308. The difference output is applied to an integrate and dump type filter 310, matched to the period of a bit at the chip rate, to develop a signal $V_N$ for each channel as follows:

$$V_N = \int_0^t s(t)[r(t_N) - e(t_N)]dt \qquad (5)$$

wherein $V_N$ and s(t) are analog signals while $r(t_N)$ and $e(t_N)$ are binary signals. The output of the integrate and dump circuit 310 is applied to a sample and hold circuit 312 which monitors and stores the magnitude and polarity of the integrator output $V_N$. This value if applied to a conventional microprocessor 314 that in response to outputs from all N of the detectors 302 extracts the binary data from the predetermined transmission and develops a timing error signal to retain the receiver locked in synchronism with the predetermined transmitter, as discussed in more detail below.

The analog multiple channel correlation detector shown in FIG. 11 requires a substantial number of calibration adjustments associated with the multipliers 304, 306, the difference circuits 308, the integrate and dump circuits 310 and the sample and hold circuits 312. In practice, an 8-channel detector of this type requires approximately 80 calibration adjustments.

If only the polarity of the reference sequences r(t) and e(t) is used, considerable simplification of the system results, with only a slight degradation in performance. Because the two reference sequences are binary (bipolar) signals, multiplication can be achieved in an N channel correlator using 2N two-input analog multiplexers and one inverter, shown in FIG. 12. In this implementation, the binary reference signal determines whether the input signal s(t) or an inverted input signal $\overline{s(t)}$ is selected to be applied to subtraction circuit 308. Bearing in mind that the desired output of each of the N difference circuits 308 is $s(t_N)[r(t_N) - e(t_N)]$, each channel in the correlation detector 400 shown in FIG. 12 comprises a first two-input multiplexer 402 and a second two-input multiplexer 404 controlled, respectively, by the instantaneous polarities of the first and second bipolar reference sequences $r(t_N)$ and $e(t_N)$. One input of each of the two multiplexers 402, 404 is connected to a first line 406 that receives the incoming sequences s(t) and a second input connected to a line 408. The line 408 receives the incoming sequences $\overline{s(t)}$ inverted in polarity by an inverter 410. The multiplexers 402 and 404 are driven by the reference sequences $r(t_N)$ and $e(t_N)$ through drivers 412 and 414.

Assuming that the polarities of $r(t_N)$ and $e(t_N)$ are identical, both of the multiplexers 402 and 404 are connected to the line 406. The input sequence s(t) is thus applied to both the positive and negative input terminals of the difference circuit 308 whereby a zero signal is applied to integrate and dump circuit 310 (FIG. 11). If $r(t_N)$ is positive and $e(t_N)$ is negative, multiplexer 402 is connected to line 406 and multiplexer 404 is connected to line 408. The sequence s(t) is thus applied to the positive input of difference circuit 308 and the inverted sequence $\overline{s(t)}$ is applied to the negative input terminal of circuit 308; the sequence 2s(t) is thus applied to integrate and dump circuit 310. If, on the other hand, the relative polarities of the two reference sequences are reversed, the sequence s(t) is applied to the negative input of difference circuit 308 and the inverted input sequence s(t) is applied to the positive input of difference circuit 308. The signal $-2s(t)$ is thus applied to integrate and dump circuit 310, thereby satisfying the equation $$V_N(t) = s(t_N)[r(t_N) - e(t_N)].$$

Figure 12:
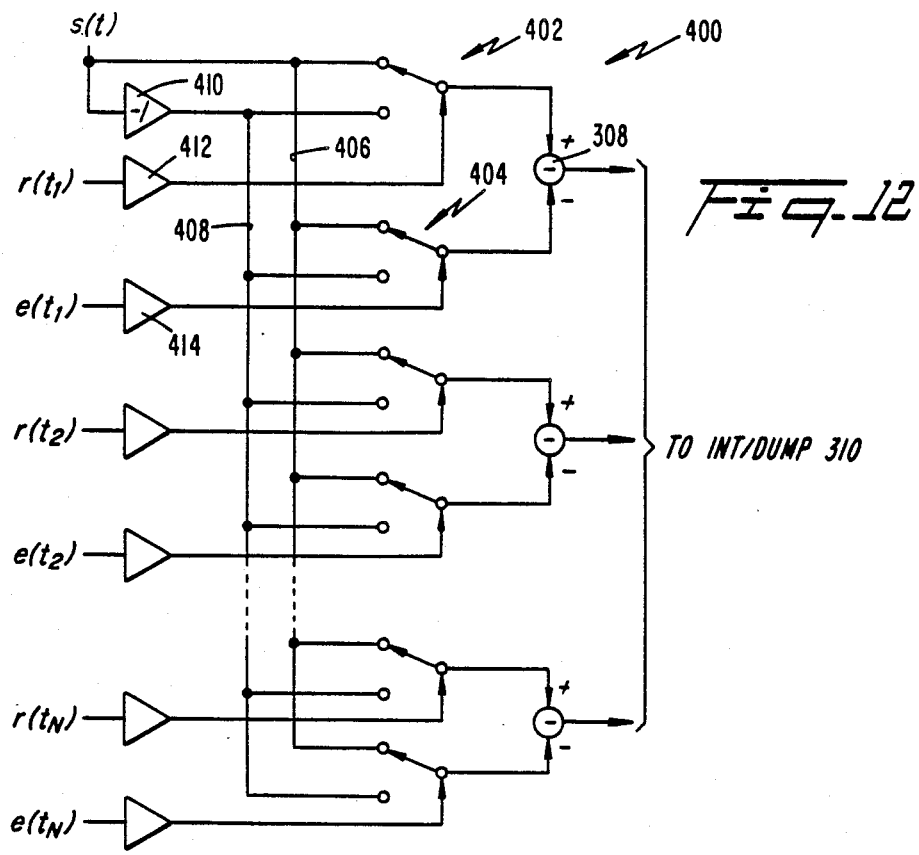
FIG. 12 is a circuit simplification of the analog embodiment of FIG. 11 using binary reference signals.

The circuit of FIG. 12 is advantageous over the circuit of FIG. 11 because analog multiplier calibration adjustments are not required in FIG. 12, although the inverter 410 requires two (balance and offset) calibration adjustments. The number of adjustments required for an eight-channel detector is thus reduced from approximately 80 to 34.

Figure 13:
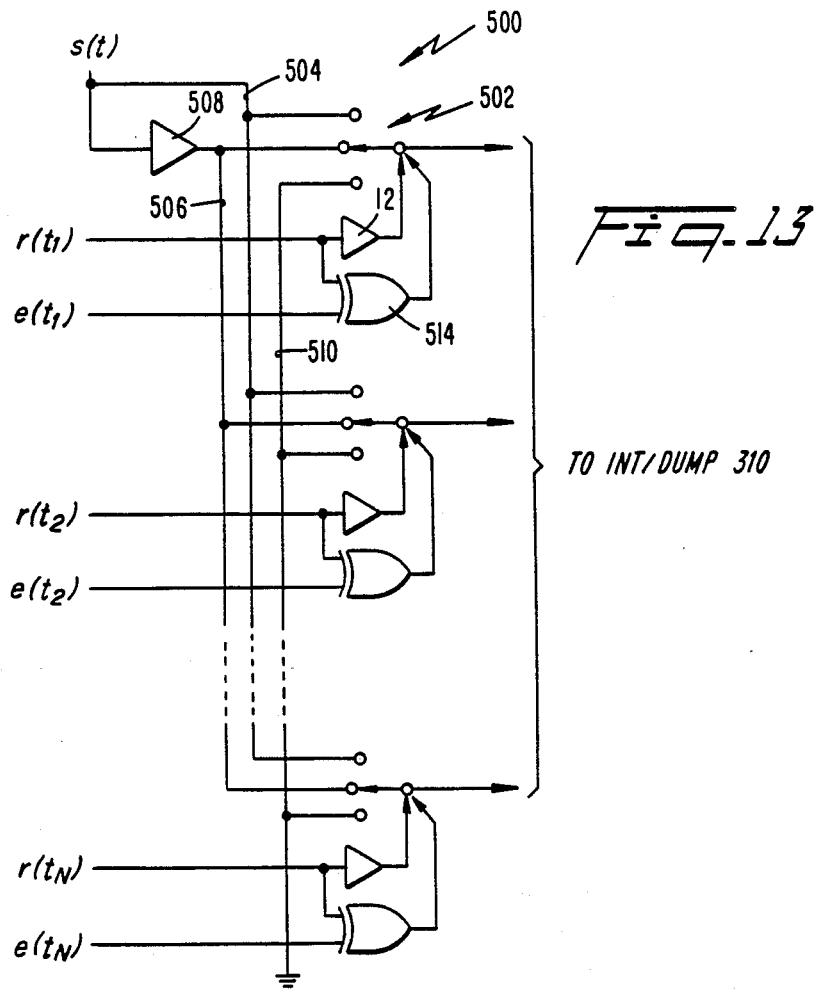
FIG. 13 is a further circuit simplification of the analog circuit of FIG. 11, using digital logic to reduce the number of analog multiplexers.

Referring to FIG. 13, a further simplification of the circuit shown in FIG. 11 can be achieved by recognizing that the input to each integrate and dump circuit 310 is the difference between two signals, each of which is the input sequence s(t) multiplied by a $+1$ or a $-1$, with the output being zero when the two reference sequences are equal to each other. In accordance with FIG. 13, the 2N multipliers and the N subtractors are replaced, in circuit 500, by N three-input analog multiplexers 502. One input of each of the multiplexers 502 is connected to a line 504 which receives the input sequence s(t). A second input of multiplexer 502 is connected to a line 506 which receives an inversion s(t) of the input sequence, inverted by 508. The third input of multiplexer 502 is connected to a line 510 that in turn is connected to ground.

The first reference sequence $r(t_n)$ is connected directly to the control input of multiplexer 502 through an inverter/driver 512. Also connected to the control input of multiplexer 502 is an exclusive-OR circuit 514 having inputs connected respectively to the two reference sequences $r(t_n)$ and $e(t_n)$.

When the two reference sequences are equal to each other, the output of the exclusive-OR circuit 514 drives the multiplexer to line 510, causing the output of multiplexer 502 to generate a zero signal to integrate/dump circuit 310 (FIG. 11). If the first reference $r(t_n)$ equals 1, the output v(t) of multiplexer 502 equals s(t). If r(t) equals 0, on the other hand, the multiplexer output v(t) equals −s(t). The output of the difference circuit thus generates the signal $s(t_n)[r(t_n)-e(t_n)]$ and the integrate and dump output for each channel is $$\int_0^1 s(t)[r(t_n) - e(t_n)]dt, \text{ as required.} \quad (6)$$

Figure 14A:
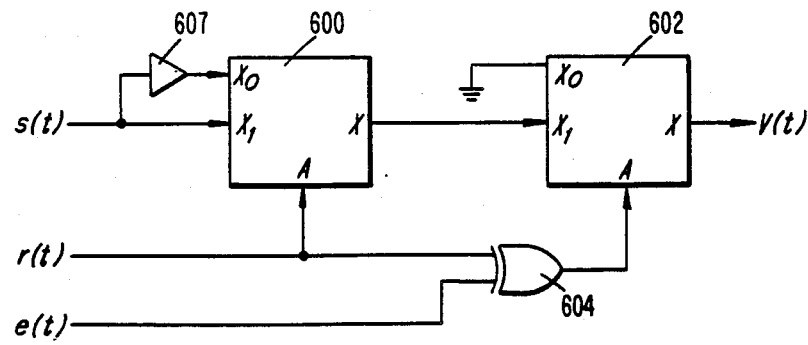
FIGS. 14(a) and 14(b) illustrate two methods of implementing the circuit of FIG. 13.
Figure 14B:
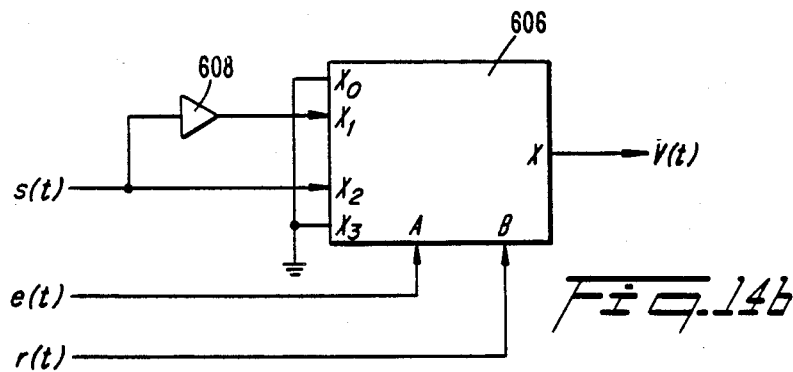

Two circuits for implementing the three-input analog multiplexer 502 of FIG. 13 are shown respectively in FIGS. 14a and 14b. In FIG. 14a, each of the two two-input multiplexers 600, 602 have the following characteristics:

$x = x_0$, when A=0;
$x = x_1$, when A=1.

The first reference sequence r(t) is connected to control terminal A of multiplexer 600 and to one input of an exclusive-OR circuit 604. The second reference sequence e(t) is connected to a second input of exclusive-OR circuit 604. The output of the exclusive-OR 604 is connected to the control terminal A of multiplexer 602. The incoming sequences s(t) are connected to one input terminal $x_1$ of multiplexer 600, and, through an inverter 606, to the seconsd input $x_0$ of the same multiplexer. The output x of multiplexer 600 is applied to one input $x_1$ of multiplexer 602; the second input $x_0$ of multiplexer 602 is connected to ground.

The output v(t) of the multiplexer shown in FIG. 14a is defined by the following truth table, which corresponds to the required equation $v(t)=s(t)[r(t_n)-e(t_n)]$.

TABLE III

| r(t) | e(t) | r ⊕ e | v(t) |
|---|---|---|---|
| 0 | 0 | 0 | 0 |
| 0 | 1 | 1 | −s(t) |
| 1 | 0 | 1 | s(t) |
| 1 | 1 | 0 | 0 |

In the embodiment of the three-input multiplexer 606 shown in FIG. 14b, the output x is connected selectively to any one of the four inputs $x_0$, $x_1$, $x_2$, $x_3$, depending upon the binary values of control inputs A, B. The input sequences s(t) are connected directly to input $x_2$ and through an inverter 608 to input $x_1$. Inputs $x_0$ and $x_3$ are connected to ground. The two reference sequences e(t) and r(t) are connected respectively to control inputs A and B of multiplexer 606.

The operation of multiplexer 606 is described by the truth table set forth above with respect to FIG. 14a and also provides the desired output v(t).

The correlation detector embodiments of FIGS. 11-14 are based upon the analog technique of integrating a continuous signal. The number of calibration adjustments required can be reduced further by replacing analog integration in the correlation detector by discrete signal summation. Referring to FIG. 15, correlation detector 700, provided in each channel of the receiver, digitizes the incoming sequences s(t) and algebraically sums the digitized signal in an accumulator over a period of time equal to a bit period. The difference between the initial and final values in the accumulator represents the value of s(t) integrated over a bit period. Accumulation is controlled by the values of the reference sequences r(t) and e(t). When the two reference sequences are equal, the accumulated value is unchanged. When r(t) and e(t) are unequal, the accumulation is incremented or decremented by the value of s(t) depending upon the value of r(t).

Correlation detector 700 comprises an analog-to-digital converter 702 that receives the analog sequence s(t) and in response generates a corresponding digital signal at output terminal D. The output of analog-to-digital converter 702 is applied to one input A of an adder/subtracter circuit 704 having an output applied to the input of an accumulator register 706. The output of the accumulator 706 is applied to output register 708 and also to the second input B of adder/subtracter 704.

Operation of the units 702–708 as well as of a sequencer 710 are synchronized to a bit period T. Sequencer 710 in turn controls the conversion times of A/D converter 702 and the accumulation times of accumulator register 706 at outputs 712 and 714, respectively. The accumulator register 706 is also controlled by the values of the two refrence sequences r(t) and e(t) through exclusive-OR gate 716 and AND gate 718.

The adder/subtracter 704 develops an output signal which is the sum of the digitized input sequence s(t) and the contents of accumulator register 706 when reference sequence r(t) is 1 and generates the difference between the accumulator register contents and the digitized value of input sequence s(t) when reference sequence r(t) is zero. Selective addition and subtraction of the two signals applied to adder/subtracter inputs A, B are controlled by the signal applied at input F, developed by reference sequence r(t) through an inverter 720.

If r(t) equals e(t), the exclusive-OR gate 716 develops a logic 0 signal that is applied to one input of AND gate 718. To the output input of AND gate 718 is a write-accumulation signal developed by sequencer 710. Sequencer 710 alternately develops a "convert input" signal applied to A/D converter 702 to provide an analog-to-digital conversion of input sequence s(t) and a "write accumulator" signal which adds or subtracts the instantaneous value of s(t) to the current accumulated value, to be applied to output register 708 and then to microprocessor 314 (FIG. 11) which develops binary output and timing error signals.

Thus, the content of the accumulator register 706 remains unchanged when r(t) equals e(t) under control of an exclusive-OR gate 716. When r(t) equals a logic 1, the content of accumulator register 706 is incremented by the value of the incoming sequence s(t); when r(t) equals a logic 0, on the other hand, the content of the accumulator register is decremented by the value of the input sequence s(t). This has the effect of multiplying s(t) by +1 or −1 and integrating.

The correlation detector 700 of FIG. 15 is generalized into an N-channel correlation detector 800 in FIG. 16. The reference sequences $r(t_n)$ and $e(t_n)$ are applied to an input latch 802 having $r(t_n)$ and $e(t_n)$ outputs that are applied respectively to a pair of N to 1 multiplexers 804, 806. The outputs of the two multiplexers 804, 806 in turn are applied to the inputs of exclusive-OR gate 808 that controls accumulator memory 810s through AND gate 812.

Accumulator memory 810 in FIG. 16 corresponds to accumulator register 706 in FIG. 15. Memory 810, however, contains a plurality of memory regions corresponding to each channel and addressed by a channel sequencer 814 controlled by the output of sequencer 816. Similarly, the output of accumulator memory 810 is applied to an output memory 818 that corresponds to output register 708 in FIG. 15. Memory 818, however, contains a plurality of memory regions corresponding to the correlation channels and addressed by the output of sequencer 816.

The incoming sequence s(t) is sampled by a sample and hold circuit 820 and applied to analog-to-digital converter 822 wherein the incoming analog sequence s(t) is digitized and applied to adder/subtracter 824 in a manner described with respect to FIG. 15.

In operation, sample and hold circuit 820 samples the incoming analog sequence s(t) and converts the samples to corresponding digital values in synchronism with the bit period T developed by microprocessor 314 (FIG. 11) and applied to sequencer 816. The content of the accumulator memory 810, within each memory region addressed by sequencer 816 is incremented or decremented by the current value of s(t), depending upon the value of the reference sequence r(t) at the corresponding channel. The circuit 800 thus successively samples the input sequence, multiplies the sequence by +1 or −1 and integrates for each channel N, under control of channel sequencer 814 and sequencer 816, as well as of the microprocessor 314. The accumulator memory 810 and output memory 818 thus monitor N accumulation channels, with time synchronism of signals during channel sequencing being preserved by the sample and hold circuit 820 and the input latch 802.

Referring now to FIG. 17, another digital implementation of a single channel correlation detector 900 comprises a conventional voltage-to-frequency converter 902 that receives the absolute value of input sequence s(t) through an absolute value circuit 904. Absolute value circuit 904 is required because the voltage-to-frequency converter 902 responds, as is conventional, to a unipolar input signal. Voltage-to-frequency converter 902 converts the instantaneous magnitude of the incoming sequence s(t) to a single corresponding frequency signal to be applied to an up/down counter 906 through one input of an AND gate 908.

The input sequence s(t) is also applied to an analog comparator 908 which keeps track of the polarity of the input sequence s(t). In other words, the output of the analog comparator 908 is representative of the sign of the input sequence s(t). The reference sequences r(t) and e(t) are applied to the remaining input of gate 908 through exclusive-OR gate 910.

The up/down counter 906 is controlled by a second exclusive-OR gate 912 that receives the output of the analog comparator 908 and the first reference sequence r(t). Thus, the up/down counter is controlled to increment when the signs of the input sequence s(t) and reference sequence r(t) are the same; otherwise the counter is caused to decrement. The output of counter 906 is applied to a latch 914 synchronized to bit period T.

The clock CLK of up/down counter 906 is disabled by exclusive OR gate 910 when the two reference sequences r(t) and e(t) are equal to each other. Otherwise, the counter clock is enabled and the counter 906 tracks the incoming sequence s(t). In other words, when r(t) is 1, the counter counts up for a positive polarity sequence bit s(t) and counts down for a negative polarity sequence bit s(t). When the reference sequence r(t) is a logic zero, on the other hand, accumulation is subtracted and the count direction is reversed.

Figure 18:
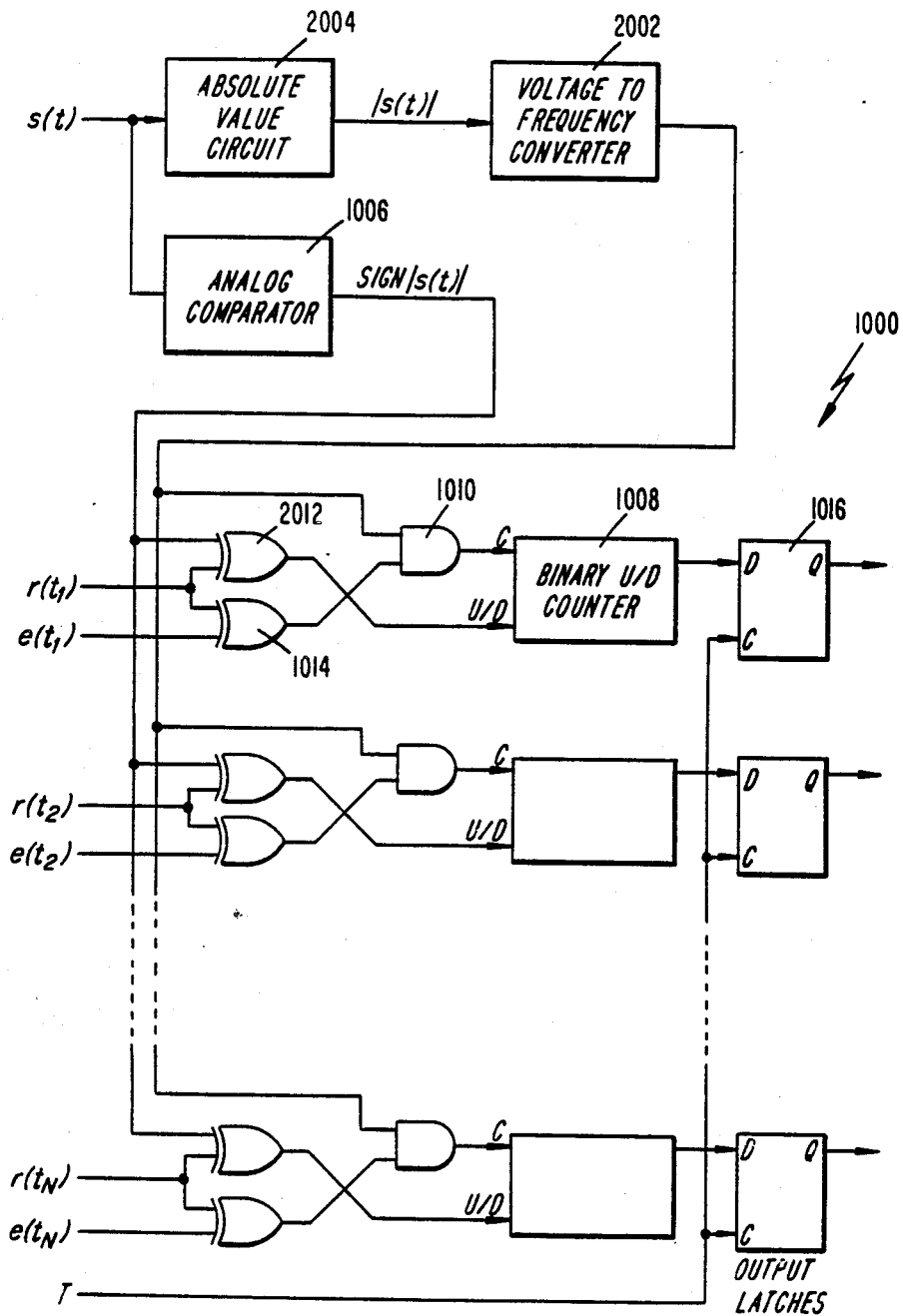
FIG. 18 is an N-channel generalization of the circuit shown in FIG. 17.

The circuit 900 of FIG. 17 is generalized to N channels of correlation detection by circuit 1000 in FIG. 18. In circuit 1000, voltage-to-frequency converter 1002, absolute value circuit 1004 and analog comparator 1006 correspond to corresponding components in FIG. 17 and are common in all channels. Up/down counter 1008 as well as AND gate 1010 and exclusive-OR gates 1012 and 1014, however, are duplicated for each channel. The output of each binary up/down counter 1008 is applied to a latch 1016, commonly synchronized to a bit period T. The outputs of the N latches are applied to microprocessor 314 (such as shown in FIG. 11) which processes the individual channel correlation signals and in response develops binary data recovered from the predetermined transmitter and timing signals to shift receiver timing into synchronism with the predetermined transmitter.

Dynamic Synchronization

As discussed above, static synchronization involves establishing predetermined delays in the receiver that correspond to different propagation times associated with different transmitters. Static delays, preset in the receiver during initial set-up, synchronize the transmitter and receiver to within one code chip of each other. Perfect correlation is then established by microprocessor 314 in response to the correlation signals developed by the correlation detectors described above. Microprocessor 314 more specifically processes the channel correlation signals to control receiver timing to synchronize to the predetermined transmitter in two stages; namely, fine and coarse tuning, followed by synchronization correction, if necessary, to the proper pulses of the system clock.

Referring again to FIG. 10, it is recalled that code correlation is a function of code chip time delay differences between a received code and a reference code and, depending upon the particular correlation properties of the code employed, has a peak when synchronization is achieved and has an absolute value that drops to zero as the synchronization difference approaches a code chip or greater. Data are recovered from the correlation pattern, based upon the recognition that the sign of the pattern depends upon the data bit used to modulate the transmitter. Thus, when the receiver and a predetermined transmitter are properly synchronized to each other, transmitted data are recovered by monitoring the sign of the voltage V1 at the primary correlation channel.

Fine Tuning

Figure 19:
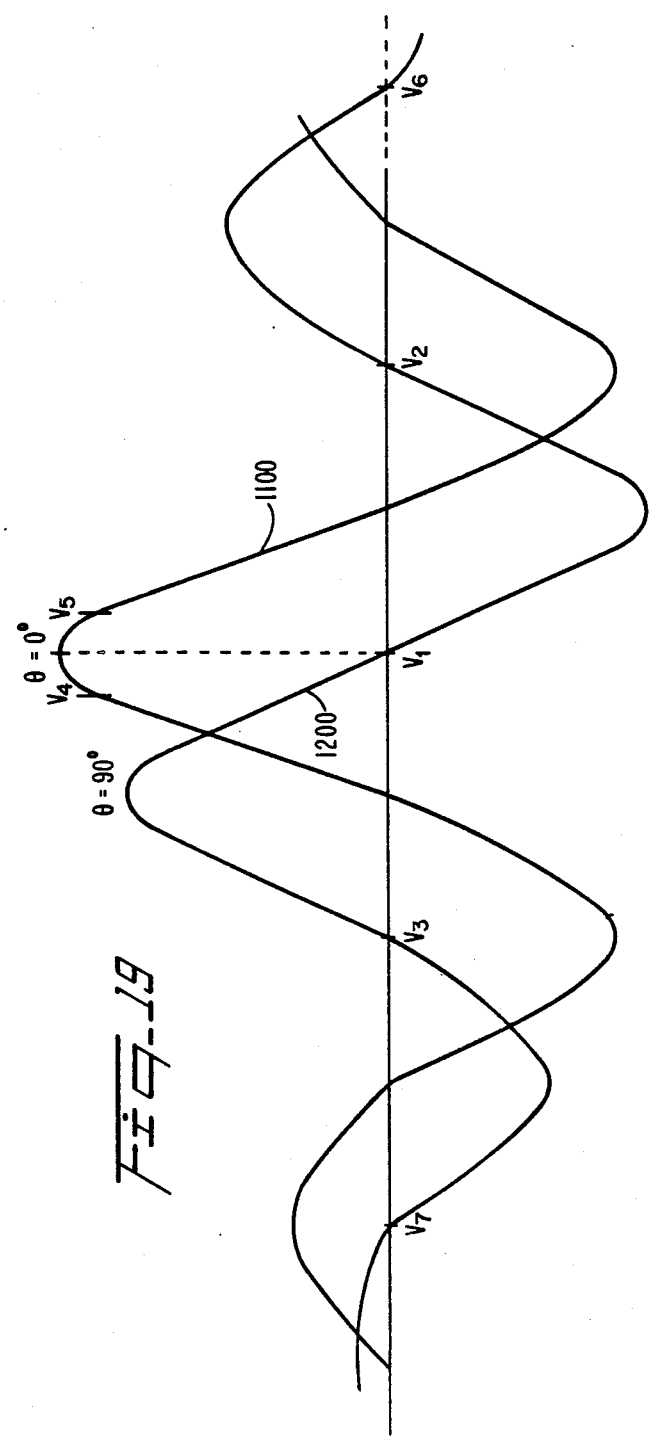
FIG. 19 illustrates an in-phase and quadrature-phase correlation pattern, together with the locations of sub-receiver channels for correlation detection.

Referring to FIG. 19, a correlation pattern corresponding to the correlation pattern shown in FIG. 10 is identified by 1100. This is an "in-phase" correlation pattern, with coarse correction channels V1, V2, V3, V6 and V7 that are used to determine which of the correlation peaks corresponds to the primary channel, with maximum correlation at synchronization. An additional pair of channels V4, V5 are fine, or vernier, correction channels, which maintain receiver synchronization by maximizing the correlation output of the primary channel V1. In the foregoing discussion, it should be recognized that all references to fraction of a code chip are related to the ratio between the carrier frequency and code generation frequencies. As one example, the carrier frequency is 5670 Hz, and the code generation frequency is at 3870 bits/second, so that references to fractions of a code chip are related by a ratio of 3/2, allowing three peaks per code chip. The additional correlation curve 1200 in FIG. 19 is a quadrature-phase correlation curve that is displaced from the in-phase correlation curve by 90 degrees. The significance of the quadrature-phase correlation curve is that the value of the quadrature-phase curve is at zero when the value of the in-phase quadrature curve is at a maximum. As shall be discussed below, signal processing, and particularly correlation peak detection, is simplified using quadrature-phase correlation.

Figure 20A:
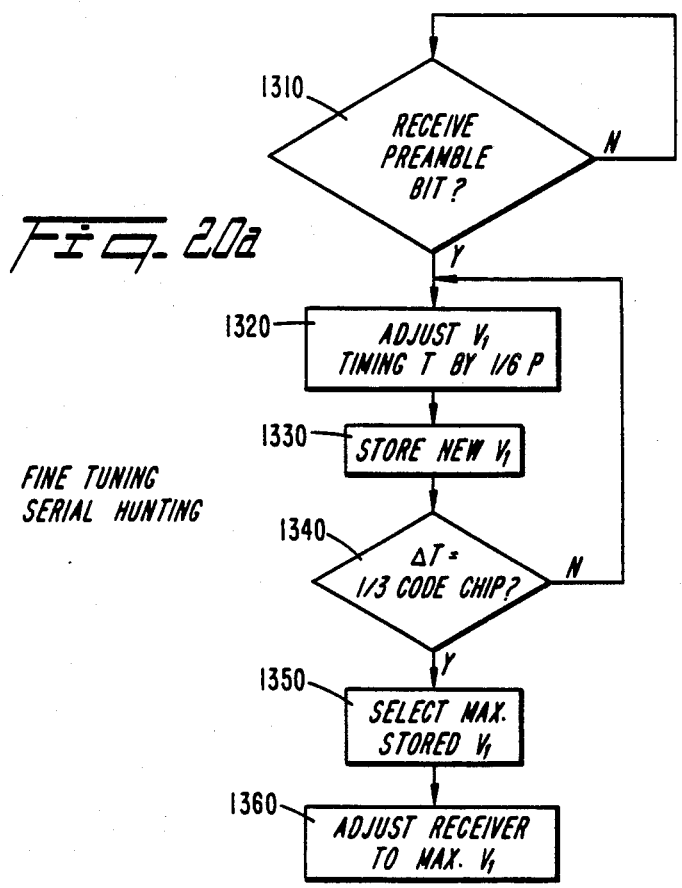

Because there are three correlation peaks per code chip, assuming that the primary correlation channel V1 is within a code chip of being properly synchronized, the primary channel V1 is within one-sixth of a code chip of a "local peak" peak. Fine tuning causes the receiver to adjust its timing, under control of microprocessor 314, such that the correlation channels V1, V2, V3, V6 and V7, spaced apart from each other by one-third of a code chip, are all located at local peaks. One method of adjusting receiver timing to locate the five correlation channels to local peaks is by serial hunting shown in the flow chart given in FIG. 20(a). This involves use of a preamble of a length 2(p·s), where s is the number of smoothings on each bit and p is equal to one-sixth (in this example) of a code chip period divided by the receiver correlation resolution, or the number of correlations of minimum resolution required to adjust the receiver from a synchronization null to a peak.

For each data bit in the preamble, the receiver primary correlation channel V1 timing is adjusted by a minimum fraction 1/6(p) of a code chip (step 1320) and the magnitude of the correlation voltage V1 is stored (1330). This process is repeated until the receiver has changed its timing over a maximum of a full one-third of a code chip (1340). Thereafter, the point at which the magnitude of the primary correlation V1 is at a maximum is selected as being the local peak (1350), and the timing of the receiver is adjusted to position channel V1 at that point (1360).

An alternative fine tuning method controlled by microprocessor 314 is the use of fine tuning channels V4 and V5 shown in FIG. 19. The fine tuning channels V4 and V5, provided by an additional pair of correlation detectors (not shown), are offset in time from the primary correlation channel V1 by an equal fraction of a code chip that is less than one-sixth of a code chip. Optionally, a preamble may be included in the method, having a worst case length of p·s with a minimum receiver correction (resolution) being 1/6(p) of a code chip. Referring to FIG. 20(b), the correlation voltages V4 and V5 are applied to microprocessor 314 (step 1950) along with the correlation voltage of the primary channel V1. By comparing the relative magnitudes of V4 and V5 (steps 1960, 1970), the microprocessor determines the direction toward which receiver timing is to be shifted (steps 1980, 1990) to position the primary channel V1 at the major local correlation peak. A system of this type is shown schematically in FIG. 21. Programming of microprocessor 314 is omitted for brevity, but is considered routine to implement based upon the simplified flow chart of FIG. 20(b) and the discussion herein.

Another alternative fine tuning method involves the use of a channel whose timing is generated with a quadrature-phase carrier. Recognizing from FIG. 19 that the nulls of the quadrature-phase correlation pattern 1200 occur at the peaks of in-phase correlation pattern 1100, an error voltage may be developed by microprocessor 314 based upon the sign of the product of the in-phase and quadrature-phase patterns. The sign of the error voltage thus indicates a direction to which receiver timing must be shifted to cause the receiver correlation channels to synchronize to local correlation peaks. It is also possible to apply the magnitudes of the in-phase and quadrature-phase correlation voltages 1100 and 1200 to determine not only the direction of shift of receiver timing to achieve synchronization but also the amount of shift required to obtain a local peak.

Figure 22B:
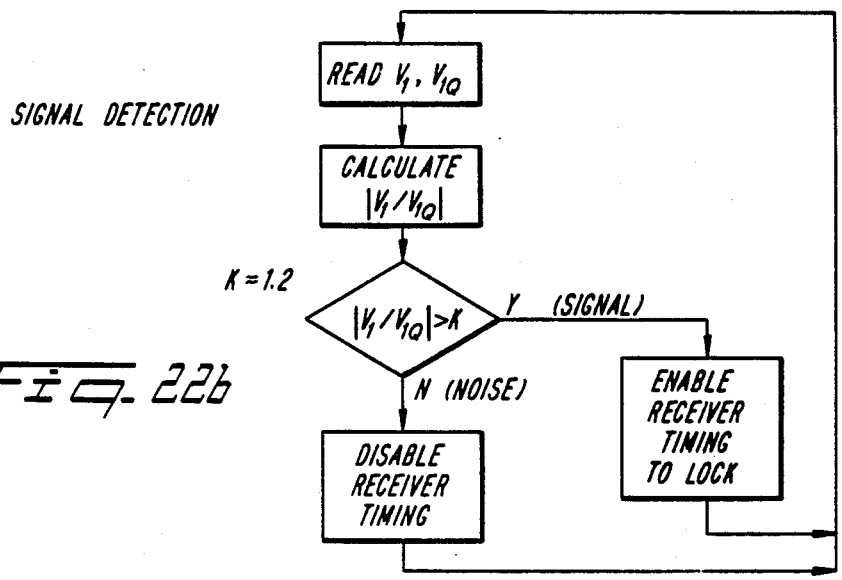

Thus, in accordance with another aspect of the invention and as summarized in the flow chart of FIG. 22(a), the in-phase V1 and quadrature-phase V1q correlation voltages are measured (step 2050). The ratio of the in-phase V1 and quadrature-phase V1q correlation voltages is calculated (2060), and if the ratio is positive (2080), the two correlations are presumed to have the same polarity and receiver timing delay is increased (2095); otherwise, the two correlations are presumed to have opposite polarities and receiver timing delay is increased (2090). To prevent receiver timing from being changed if the receiver is perfectly synchronized to the predetermined transmitter, and to avoid complications caused by delay in the receiver whereby a correction decision is made using information that is more than one data bit old, the absolute value of the ratio V1/V1q, which is essentially a cotangent function, is monitored. A table stored in a memory associated with microprocessor 312 relates the ratio V1/V1q to the number of fine tuning corrections, e.g., 1/48th of a code chip for each correction, to reach optimal synchronization. The table is set forth below.

TABLE IV

| Number of Corrections (Equal fractions of a Code Chip) | V1/V1q |
|---|---|
| 0 | ∞ |
| 1 | 5.02 |
| 2 | 2.41 |
| 3 | 1.49 |
| 4 | 1.00 |
| 5 | 0.668 |
| 6 | 0.4149 |
| 7 | 0.1999 |
| 8 | 0 |

Thus, the number of corrections applied to receiver timing is determined directly from V1/V1q, and there is a correction dead band when the ratio is greater than 5.02, eliminating receiver hunting about optimum synchronization. Furthermore, the number of data bits needed to move the receiver from a correction null to a correlation peak is reduced from 8 (in this example) to as low as 1, minimizing the length of any required preamble and providing accelerated serial hunting. Finally, it is possible to inhibit tracking corrections on consecutive data bits without decreasing the tracking rate of the receiver, thereby eliminating overshoot.

Signal Presence Detection

The provision of quadrature-phase V1q as well as in-phase V1 correlation voltages furthermore makes it possible to determine a signal present within a background of noise. As summarized in the program flow chart of FIG. 22(b), when only noise is present at the receiver input, both the in-phase V1 and quadrature-phase V1q voltages will have approximately the same value K, such that the ratio V1/V1q will be close to unity. With both signal and noise present, however, fine tuning maximizes V1 and minimizes V1q to obtain a ratio much greater than unity. The ratio V1/V1q is thus used as an indication of signal present. In practice, the ratio may be monitored over a number of data bits, with smoothing techniques or majority voting being applied to ensure accuracy.

Figure 21:
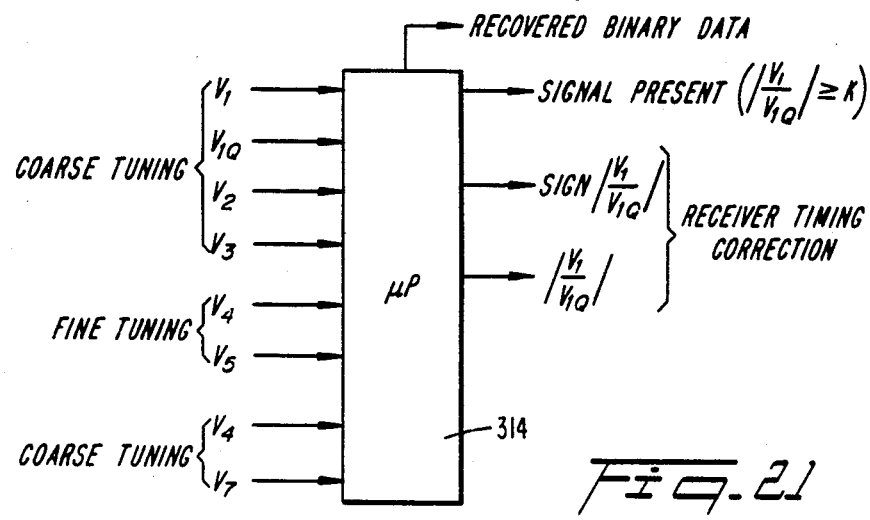
FIG. 21 illustrates a microprocessor based circuit for performing fine tuning of the receiver and signal presence detection.

Circuitry for detecting presence of a signal in a background of noise is shown in FIG. 21, with microprocessor 314 developing signals V1 and V1q in response to the outputs of the correlation detectors discussed above. The signals V1, V1q are processed with the microprocessor 314 to develop the ratio V1/V1q and the absolute 0 value V1/V1q of the resultant is magnitude compared with a predetermined threshold magnitude to determine whether an incoming signal represents a data transmission or whether it is merely noise.

Following determination that the receiver is tuned to a local peak using fine tuning as described above, it becomes necessary to determine through coarse tuning, whether the current local peak is the "correct" local peak such that the receiver has best correlation.

Coarse Tuning

In accordance with one embodiment, coarse tuning of the receiver to a predetermined transmitter to ensure that the receiver is tuned to the maximum, and other than a secondary, correlation peak involves serial hunting wherein, having once fixed a point as a local peak, the receiver is adjusted in multiples of one-third of a code chip to measure the magnitude of the receive signal at each adjacent local peak. Once the magnitudes of the peaks are determined, a decision as to the proper peak is made. Because the magnitudes of adjacent peaks near the center of the correlation pattern are difficult to distinguish from one another due to channel filter distortion, a conventional "center-of-mass" approach may be used to identify the maximum local peak by basing the decision on the relative values of all channels rather than on only a selection of the channel having the greatest correlation magnitude.

The microprocessor 314 is programmed in a coarse tuning, serial hunt mode to cause the receiver, following identification of a local peak, to shift a timing by multiples of one-third of a code chip, measure and store correlation magnitudes and make comparisons using the center of mass approach or other approach to identify the correct correlation peak. Serial hunting requires a transmission preamble of length W·s where W is the width of the peak search range (in thirds of a code chip) and s is the number of bits of smoothing in the voltage readings.

In FIG. 23, a simplified flow chart of programming of microprocessor 314 to provide coarse tuning by serial hunting includes a test at step 1200 to determine, using fine tuning as discussed above, whether the receiver is at a local peak. If the receiver is not at a local peak, the receiver is fine tuned until the receiver is determined to be at a local peak. The receiver, once at a local peak, is incremented (step 1202) until its timing is at K+N, wherein K is the timing of the local peak obtained during fine tuning and N is a predetermined number of thirds of a code chip. The correlation value of K+N is measured and stored (step 1204), and the receiver timing is decremented by one-third of a code chip (step 1206). The correlation of the receiver and predetermined transmitter is now measured and stored (step 1208), and receiver timing is tested to determine whether it is at (K−N), that is, at the opposite side of the initially detected local peak K (step 1210). If not, the receiver timing is again decremented and the correlation is measured and stored. Otherwise, all the stored correlations are tested (step 1212) to identify a peak correlation.

In accordance with another embodiment, to reduce the preamble length, multiple secondary receiver channels, offset from each other by multiples of one-third of a code chip on both sides of the primary channel V1 develop primary and secondary correlation signals to be applied to microprocessor 314. The microprocessor 314 is programmed, using center of mass analysis or other analysis, to identify the primary channel V1 which has the greatest maximum correlation and the secondary channels. By using a multiple number of receiver channels or correlation detectors, rather than serial hunting circuitry or programming, the length of the preamble required for coarse corrections may be reduced to the number of bits of smoothing, s. This assumes of course that for the desired widths of search, a channel exists with common offsets of multiples of one-third of a code chip on both sides of the primary correlation channel V1.

With multiple receivers it is not necessary to program the microprocessor to serially hunt. The microprocessor 314 is instead programmed to simply compare the outputs of the correlation detectors, all tuned to a local peak, to identify the peak having the greatest magnitude.

Timing Signal Correction

If the data bit rate of the transmission is less than one-half the pulse repetition rate of the timing source, the transmitter and receiver may become locked to different timing pulses even though they appear to be perfectly synchronized to each other. For example, for a data bit rate of 30 bits per second, a timing pulse source 60 Hz and a carrier frequency located between 60 Hz harmonics, the transmitter may become locked to a first 60 Hz timing pulse with the receiver locked to the next successive 60 Hz timing pulse. An alternating data transmission will not be detected due to improper receiver data timing recovery with otherwise perfect synchronization between the receiver and transmitter.

To illustrate this condition more clearly, FIG. 24(a) is a diagram representing the timing pulses to which the receiver and a predetermined transmitter are synchronized. The transmitter carrier is shown in FIG. 24(b) and transmitted data representing alternate ones and zeros are shown in FIG. 24(b). Assuming that the receiver and transmitter are synchronized to the same timing pulses, the integrate and dump circuits 310 of the receiver will be synchronized to the transmitted data inversions so as to dump at the trailing edge of each datum, as shown in FIG. 24(d), where "dots" designate integration dump points. The sampled integrator output is thus a replica of the data embedded within the transmission.

If the transmitter and receiver are not synchronized to the same timing pulses, however, the integrate and dump circuits 310 will not be properly synchronized to the data being transmitted. This condition is shown is FIG. 24(c), where the integration dump points occur between transmission data inversions, and the sampled output of the integrator 310 is at zero.

In other words, with the receiver and transmitter respectively synchronized to successive, rather than the same, timing pulses, it is impossible to recover any of the transmission data. It is therefore necessary to test the receiver and transmitter to ensure that the two units are synchronized to the same, rather than successive, timing pulses.

In accordance with one aspect of the invention, associated with the primary receiver channel V1 is a secondary receiver channel V1' having a built-in additional delay of one-half a data bit. One of the two channels V1 and V1' will always therefore detect the transmitted signal. A determination is made by applying an alternating data preamble associated with the transmission to the primary and secondary receiver channels. By comparing the magnitudes of the correlation outputs of the two receiver channels, the correct channel (having the larger correlation magnitude) is the one synchronized to the same timing pulse as the transmitter is. Data are monitored at the "correct" channel only.

Figure 25:
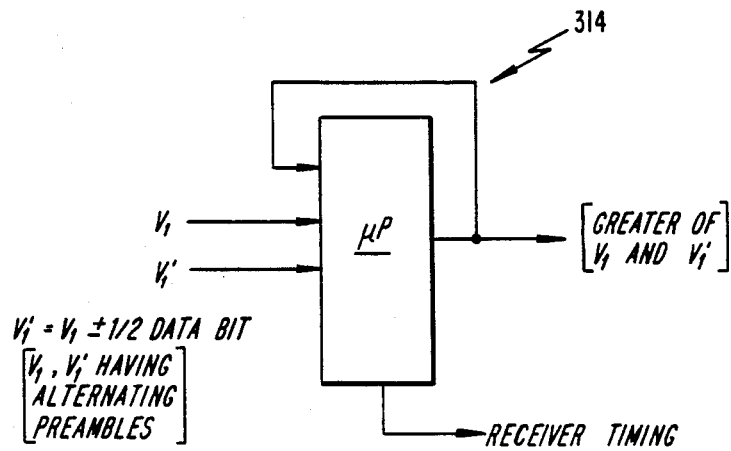
FIG. 25 illustrates a circuit for locking a transmitter and receiver to the same timing pulses.

A simplified circuit for synchronizing receiver timing to cause the receiver and transmitter to be locked to the same timing pulses as shown in FIG. 25. Microprocessor 314 develops a secondary channel V1' offset from channel V1 by one-half of a data bit. In response to an incoming sequence having an alternating preamble, the microprocessor compares the magnitudes of the data outputs from the channel V1 and its half bit delayed channel V1', and identifies the one channel having the larger magnitude. This channel is thus presumed to be the one which is locked to the same timing pulses as the transmitter is, and is reapplied to the microprocessor for data recovery.

In an alternative embodiment of the invention, the need for the secondary receiver channel V1' may be eliminated. The transmitter and receiver can be synchronized when the timing reference frequency is less than or equal to the data sampling rate and the ratio of the data sampling rate to the timing reference frequency is an integer by combining more than one of the consecutive data samples together to yield one data point or bit. By combining these data samples, an optimum data sample point may be determined while receiving an alternating sign preamble by comparing the magnitudes of all possible summations and selecting the sample which give a maximum output. If each sample is assigned to its own synchronization point, then synchronization may be accomplished by locking to the time that gives the maximum output.

For example, if the timing signal has a frequency of 60 Hertz and a data sampling rate of 30 samples per second, for a data rate of 30 bits per second each data sample is used to yield one data point or bit. For data rates of 15, 7.5 or 3.75 bits per second two, four and eight consecutive data samples are used to yield one data bit. In addition to eliminating the need for a redundant data channel, the above technique eliminates the need for the data sampling rate to be the same as the data rate. In fact, sampling may occur at a rate higher than the data rate. This allows the data samples to be combined digitally, for example in a microprocessor, and allows the data rate to be independent of the actual hardware timing.

Data Recovery

Data recovery in spread spectrum systems is well known. As background, reference is made to section 5.3 of the Dixon test mentioned earlier, and particularly to the discussion of Costas loop demodulators beginning on page 155.

Because the spread spectrum system as provided herein includes multiple correlation channels, data recovery is improved in accordance with one aspect of the invention by extracting data at each channel rather than at only a single correlation channel. It is thereby possible to lower system message error rate and possibly to also reduce the length of or eliminate any required preambles for receiver synchronization.

With reference again to FIG. 19, it is noted that the correlation pattern 1100 is centered about the primary correlation channel V1. The sign of the primary correlation channel V1 is dependent upon the sign of the data being transmitted. A positive value of V1 thus corresponds to a logic 1 being transmitted whereas a negative value of the correlation V1 corresponds to a logic 0 being transmitted.

The correlations at V2, V3, V6 and V7 also have values that correspond to the sign of the data being transmitted. Specifically, the relationship of the voltage outputs at channels V1, V2, V3, V6 and V7, in the absence of noise and distortion, are described as follows:

$$V2 = V3 = R1 \cdot V1$$

$$V6 = V7 = R2 \cdot V1 \quad (7)$$

where
$R1 = -\frac{2}{3}$
$R2 = \frac{1}{3}$

In accordance with the invention, the data sign at the output of each correlation detector, following proper receiver synchronization, is monitored. Depending upon the characteristics of noise and distortion, data may be extracted using only the outputs at channels V1, V2 and V3, with an effective signal-to-noise ratio gain of $$\frac{(1 + 1/L) \cdot \left( \sum_{j=1}^{3} u_j \cdot K_j \right)^2}{(1 + 1/L) \cdot \sum_{j=1}^{3} u_j^2 + 2 \cdot (R1 + 1/L) \cdot u1 \cdot (u2 + u3) + 2 \cdot (R2 + 1/L) \cdot u2 \cdot u3} \quad (8)$$

where $K_j$=relative noise free amplitude of $V_j$ with respect to $V_1$, j=2, 3 ($K_j$=R1 in the distortion free case), L=the length of the pseudo-random code and $u_j$=weighting factor for $V_j$, j=1, 2, 3. The weighting factors are selected according to the particular distortion present.

Figure 26:
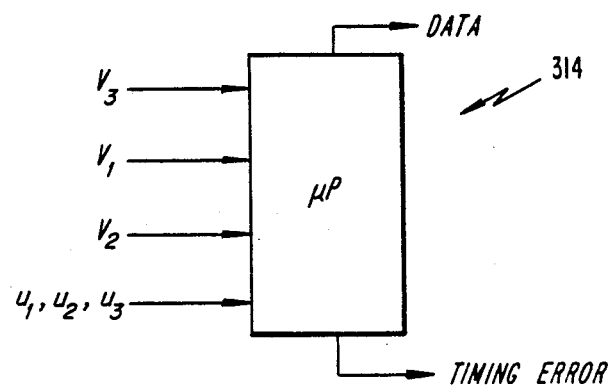
FIG. 26 illustrates a microprocessor based circuit for performing data recovery in the receiver.

FIG. 26 is a simplified circuit diagram showing microprocessor 314 responsive to channels V1, V2 and V3 and programmed to combine all three correlation channel outputs to extract transmission data, with weighting factors selected according to particular distortion known to be present on the transmission medium. Table V illustrates the signal-to-noise enhancements under a few possible distortion and weighting factor scenarios.

TABLE V

| WEIGHTING FACTORS FOR $V_j$ | | | DISTORTION FACTORS FOR $V_j$ | | | S/N IMPROVEMENT FACTOR |
|---|---|---|---|---|---|---|
| $u_1$ | $u_2$ | $u_3$ | $k_1$ | $k_2$ | $k_3$ | |
| 1 | −1 | −1 | 1 | −1 | −1 | 1.44 |
| 1 | −1 | −1 | 1 | −0.9 | −0.9 | 1.254 |
| 1 | −1 | −1 | 1 | −0.8 | −0.8 | 1.082 |
| 1 | −1 | −1 | 1 | −0.7 | −0.7 | 0.922 |
| 1 | −0.34 | −0.34 | 1 | −0.67 | −0.67 | 0.971 |
| 1 | −0.67 | −0.67 | 1 | −0.67 | −0.67 | 0.918 |
| 1 | −0.9 | −0.6 | 1 | −0.9 | −0.6 | 1.055 |
| 1 | −0.8 | −0.8 | 1 | −0.8 | −0.8 | 1.09 |
| 1 | −0.9 | −0.9 | 1 | −0.9 | −0.9 | 1.252 |

An additional advantage of providing a recovery on all channels of the receiver is that random and burst errors, which tend to affect all channels, can be identified and ignored. This is similar to signal presence detection using in-phase and quadrature-phase correlation outputs, as discussed above, but employs all channels rather than orthogonal outputs associated with a single channel.

Furthermore, as an additional advantage of obtaining data recovery at all correlation channels or at least several correlation channels, it is possible to monitor synchronization during message reception. Although synchronization adjustments are not feasible during message reception, the message content may be recovered, without repeats, using the additional receiver channels.

In this disclosure, there is shown and described only the preferred embodiments of the invention; however, it is to be understood that the invention is capable of use in various other combinations and environments and is capable of changes or modifications within the scope of the inventive concept as expressed herein.

What is claimed is:

1. In a data receiver adapted to receive a data signal from one of a plurality of transmitters, each transmitting a data signal spread by a common pseudo-random code which is a different assigned shift of a common pseudo-random code sequence and timing signals from a timing source, the receiver including means for establishing initial synchronization between the receiver and a predetermined one of the transmitters transmitting a data signal spread by the pseudo-random code having said predetermined assigned code sequence and means for sampling said data signal at an integral multiple of the frequency of the timing signal source to obtain data samples, and wherein there is a tendency of the receiver and predetermined transmitter to become locked to different signals of said timing signal source and thereby have a reduced data recovery characteristic, a method of locking said receiver and the predetermined transmitter to common timing signals following initial synchronization of said receiver and predetermined transmitter by said synchronization means, comprising the steps of:

(a) combining at least two consecutive data samples to generate data sample points corresponding to particular timing points of said timing signal source;
  (b) detecting which one of said data sample points has a maximum value; and
  (c) locking the receiver to the timing point of the timing signal source corresponding to said detected maximum value data sample point.

2. In a direct sequence spread spectrum code division multiplex system comprising a timing signal source, a plurality of transmitters synchronized to the timing signal source and each transmitting a data signal spread by common pseudo-random code which is a different assigned shift of a common pseudo-random code sequence, and a receiver normally synchronized to the timing signal source for receiving said transmitted pseudo-random code from a predetermined one of said transmitters having a predetermined assigned code sequence shift, said receiver including means for establishing initial synchronization between the receiver and a predetermined one of the transmitters transmitting a data signal spread by the pseudo-random code having said predetermined assigned code sequence and means for sampling said data signal at an integral multiple of the frequency of the timing signal source to obtain data samples, and wherein there is a tendency of the receiver and predetermined transmitter to become locked to different signals of said timing signal source and thereby have a reduced data recovery characteristic, a method of locking said receiver and predetermined transmitter to common signals of said timing source, following initial synchronization of said receiver and predetermined transmitter by said synchronization means, comprising the steps of:

(a) combining at least two consecutive data samples together to generate data sample points corresponding to particular timing points of said timing signal source;
  (b) detecting which one of said data sample points has a maximum value; and
  (c) locking the receiver to the timing point of the timing signal source corresponding to said detected maximum value data sample point.

* * * * *